(12) United States Patent
Kinoshita et al.

(10) Patent No.: US 9,571,689 B2
(45) Date of Patent: Feb. 14, 2017

(54) IMAGE SENSOR UNIT, IMAGE READING APPARATUS, AND IMAGE FORMING APPARATUS

(71) Applicant: CANON COMPONENTS, INC., Saitama (JP)

(72) Inventors: Junya Kinoshita, Saitama (JP); Takeo Yoshihara, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 14/736,362

(22) Filed: Jun. 11, 2015

(65) Prior Publication Data

US 2015/0365555 A1   Dec. 17, 2015

(30) Foreign Application Priority Data

Jun. 12, 2014   (JP) .................. 2014-121639

(51) Int. Cl.
*H04N 1/028*   (2006.01)
*G01J 1/04*   (2006.01)
*F21V 8/00*   (2006.01)

(52) U.S. Cl.
CPC ............ *H04N 1/02885* (2013.01); *G01J 1/04* (2013.01); *G01J 1/0422* (2013.01); *G02B 6/005* (2013.01); *G02B 6/0073* (2013.01); *G02B 6/0083* (2013.01); *H04N 1/02815* (2013.01); *H04N 1/02855* (2013.01); *H04N 1/02865* (2013.01); *G02B 6/0006* (2013.01)

(58) Field of Classification Search
None
See application file for complete search history.

(56) References Cited

U.S. PATENT DOCUMENTS

| 6,724,503 | B1* | 4/2004 | Sako | ................ H01L 27/14623 |
| | | | | 250/208.1 |
| 2012/0320436 | A1* | 12/2012 | Tsumekawa | ........... H04N 1/024 |
| | | | | 358/475 |
| 2013/0258426 | A1* | 10/2013 | Tsumekawa | ......... G02B 6/0031 |
| | | | | 358/475 |
| 2014/0333975 | A1* | 11/2014 | Shimoda | ............ H04N 1/02835 |
| | | | | 358/482 |

FOREIGN PATENT DOCUMENTS

JP   2013031152 A   2/2013

* cited by examiner

*Primary Examiner* — Thomas D Lee
(74) *Attorney, Agent, or Firm* — Rossi, Kimms & McDowell LLP

(57) ABSTRACT

In an image sensor unit, a frame includes a light blocking portion that protrudes toward one surface of a circuit board at a position between a light source and an image sensor. On the one surface of the circuit board, a conductive portion that continuously overlaps with external lines of the light blocking portion in a sub-scan direction in a view of the circuit board in a direction orthogonal to the one surface is formed.

29 Claims, 17 Drawing Sheets

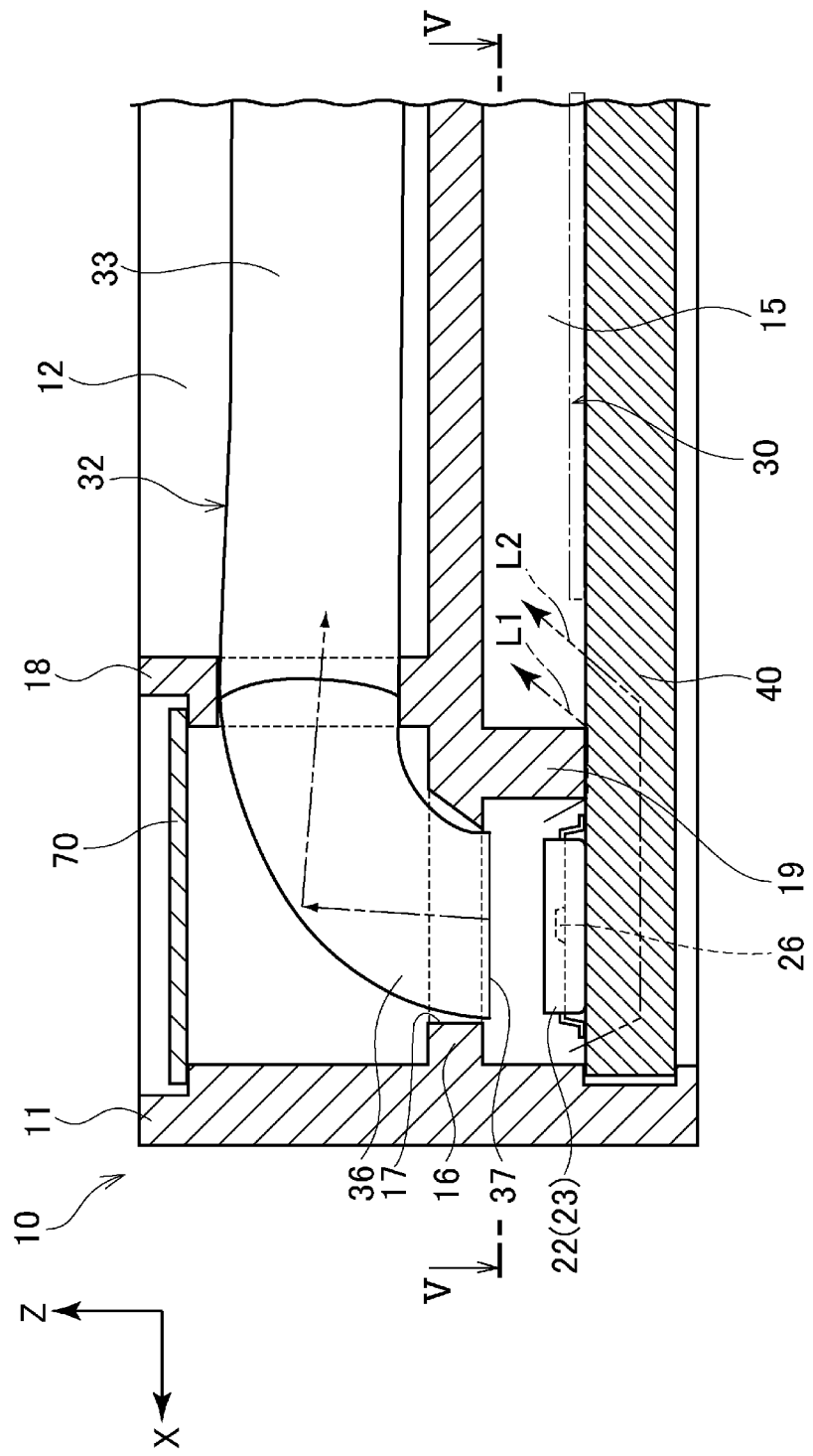

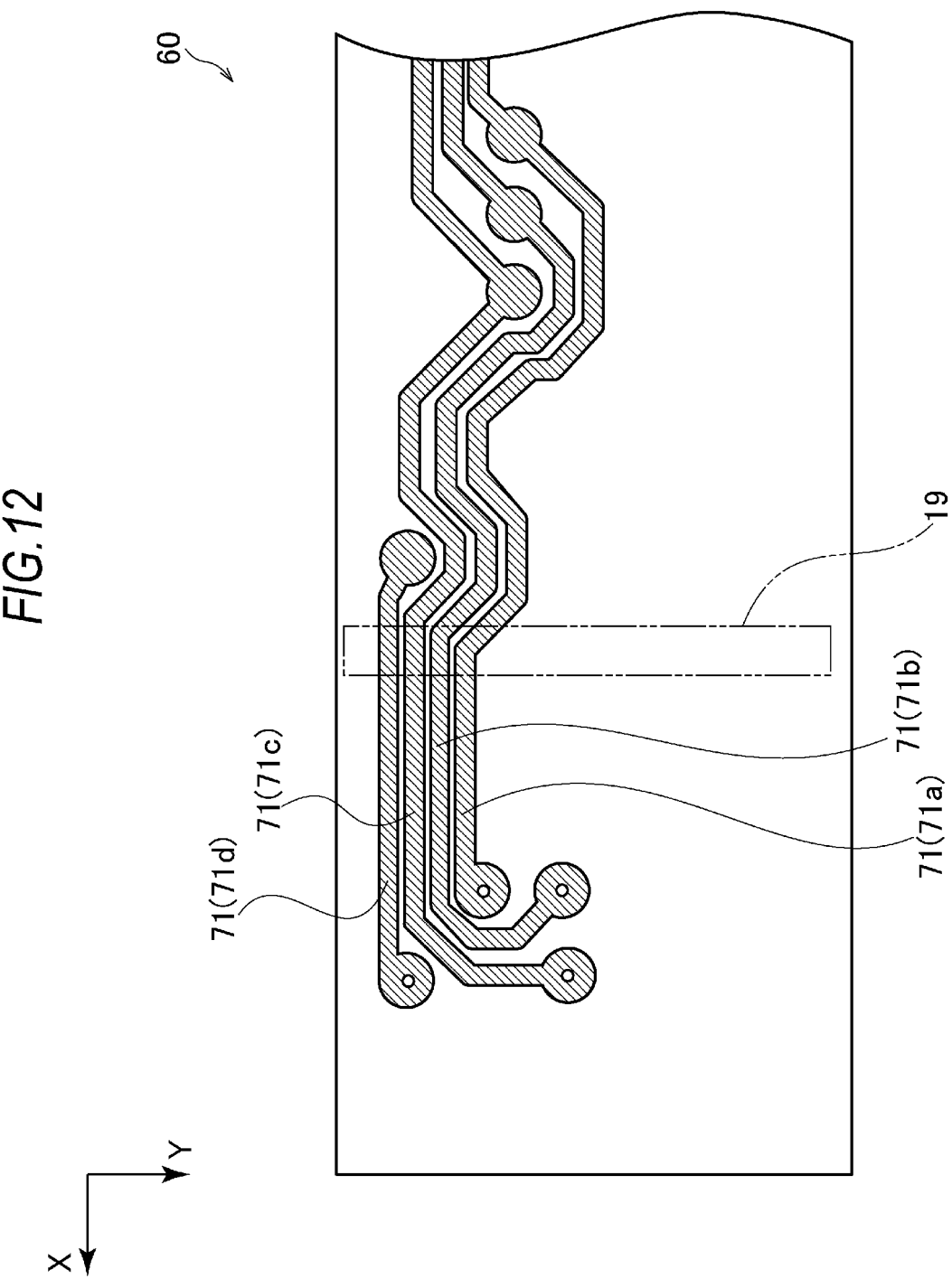

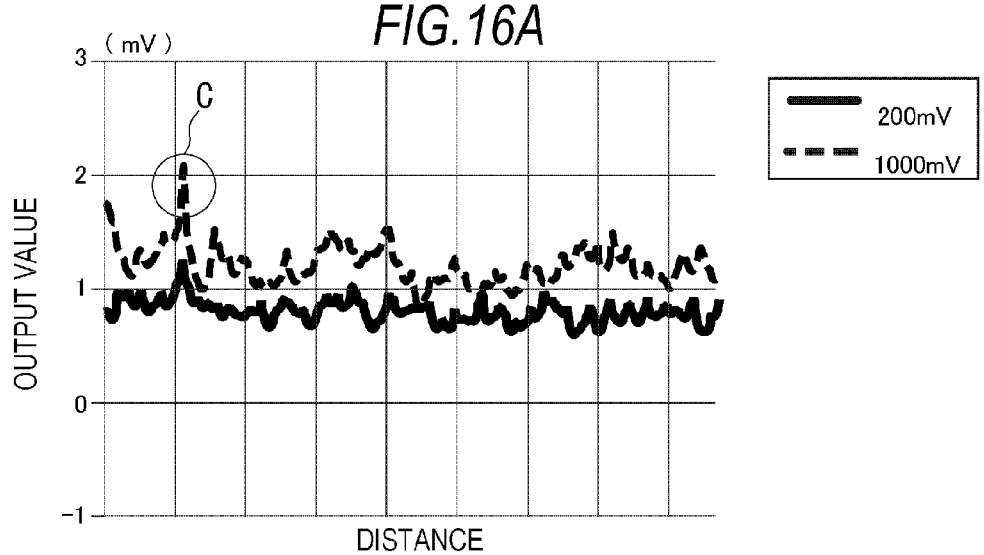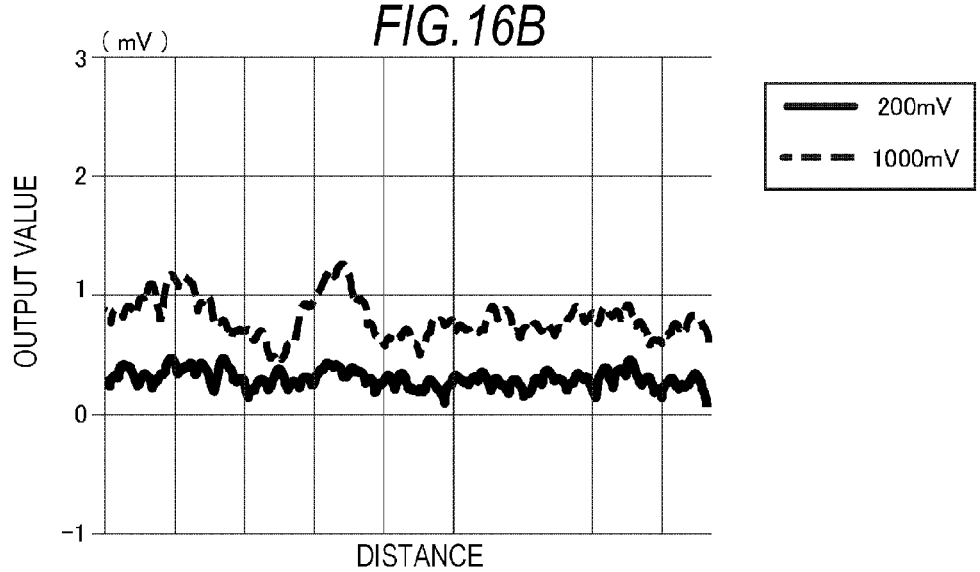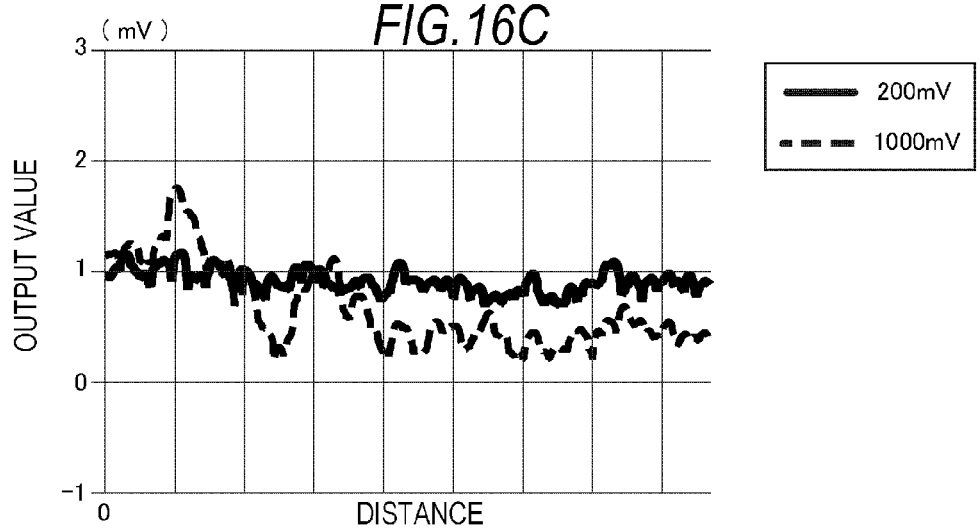

IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2014-121639, filed on Jun. 12, 2014, the entire contents of which are incorporated herein by reference.

BACKGROUND OF THE INVENTION

Field of the Invention

The present invention relates to an image sensor unit, an image reading apparatus, and an image forming apparatus.

Description of the Related Art

Image sensor units used for a scanner, a copying machine and a multifunction machine have been known. Patent Document 1 discloses an image sensor unit that includes a light guide where a light emitter and a bent portion are formed, and a circuit board on which a light source and an image sensor are mounted. In the image sensor unit in Patent Document 1, light emitted from a light source is incident on an incident surface of a bent portion of a light guide, passes through the insides of the bent portion and the light emitter, and is linearly emitted from a light emission surface of the light emitter toward an object of illumination. Light reflected by the object of illumination is received by an image sensor, whereby an image of the object of illumination is read. Thus, by using the light guide where the light emitter and the bent portion are formed, a surface-mounted LED package can be used as the light source, and the cost of the image sensor unit can be reduced.

Patent Document 1

Japanese Laid-open Patent Publication No. 2013-31152

However, in the image sensor unit as described above, the light source and the image sensor are mounted on the same circuit board. Consequently, a part of the light emitted from the light source does not enter the light guide but becomes stray light and can be received by the image sensor.

SUMMARY OF THE INVENTION

The present invention has been made in view of the problems described above, and an object of the present invention is to prevent the part of light emitted from the light source from becoming stray light and being received by the image sensor even though the light source and the image sensor are mounted on the circuit board.

An image sensor unit of the present invention is an image sensor unit that reads light having been emitted to an object of illumination, including: a light source; a light guide that includes a light emitter having an emission surface from which light is emitted toward the object of illumination, and a bent portion that is bent from an end of the light emitter and has, at an end face, an incident surface on which the light from the light source is incident; a light condenser that focuses light from the object of illumination; an image sensor that receives the light focused by the light condenser, and converts the light into an electric signal; a circuit board that mounts the light source and the image sensor on one surface; and a frame that houses the light guide, the light condenser and the circuit board, wherein the frame includes a light blocking portion that protrudes toward the one surface of the circuit board at a position between the light source and the image sensor, and, on the one surface of the circuit board, a conductive portion continuously overlapping with an external line of the light blocking portion in a sub-scan direction in a view of the circuit board in a direction orthogonal to the one surface is formed.

Further, an image forming apparatus according to the present invention includes: the image sensor unit; an image reading unit that reads light from the object of illumination while relatively moving the image sensor unit and the object of illumination; and an image forming unit that forms an image on a recording medium.

BRIEF DESCRIPTION OF THE DRAWINGS

FIG. 9 is a sectional view taken along line IV-IV illustrated in FIG. 4;

FIG. 12 is a view illustrating conductive portions formed on the other surface of the circuit board 60 of the invented example;

FIG. 16A is a graph illustrating occurrence of stray light in Comparison Example 1;

FIG. 16B is a graph illustrating occurrence of stray light in Comparison Example 2;

FIG. 16C is a graph illustrating occurrence of stray light in the invented example of a second embodiment.

DETAILED DESCRIPTION OF THE PREFERRED EMBODIMENTS

Hereinafter, embodiments to which the present invention is applicable will be described in detail with reference to drawings.

First Embodiment

This embodiment is an image sensor unit, and an image reading apparatus and an image forming apparatus to which this image sensor unit is applied. In the image reading apparatus and the image forming apparatus, the image sensor unit emits light toward an original P, which is an object of illumination, the image sensor unit converts light from the original P into an electric signal, thereby reading the image. The object of illumination is not limited to the original P. Alternatively, an object to be read, such as a bill, may be adopted. Transmission reading that reads an image by converting transmitted light having passed through the original P into an electric signal may be adopted.

In the following description, the directions of three dimensions are indicated by respective arrows X, Y and Z. The X direction is a main-scan direction. The Y direction is a sub-scanning direction perpendicular to the main-scan direction. The Z direction is a vertical direction (upward and downward direction).

Figure 2:
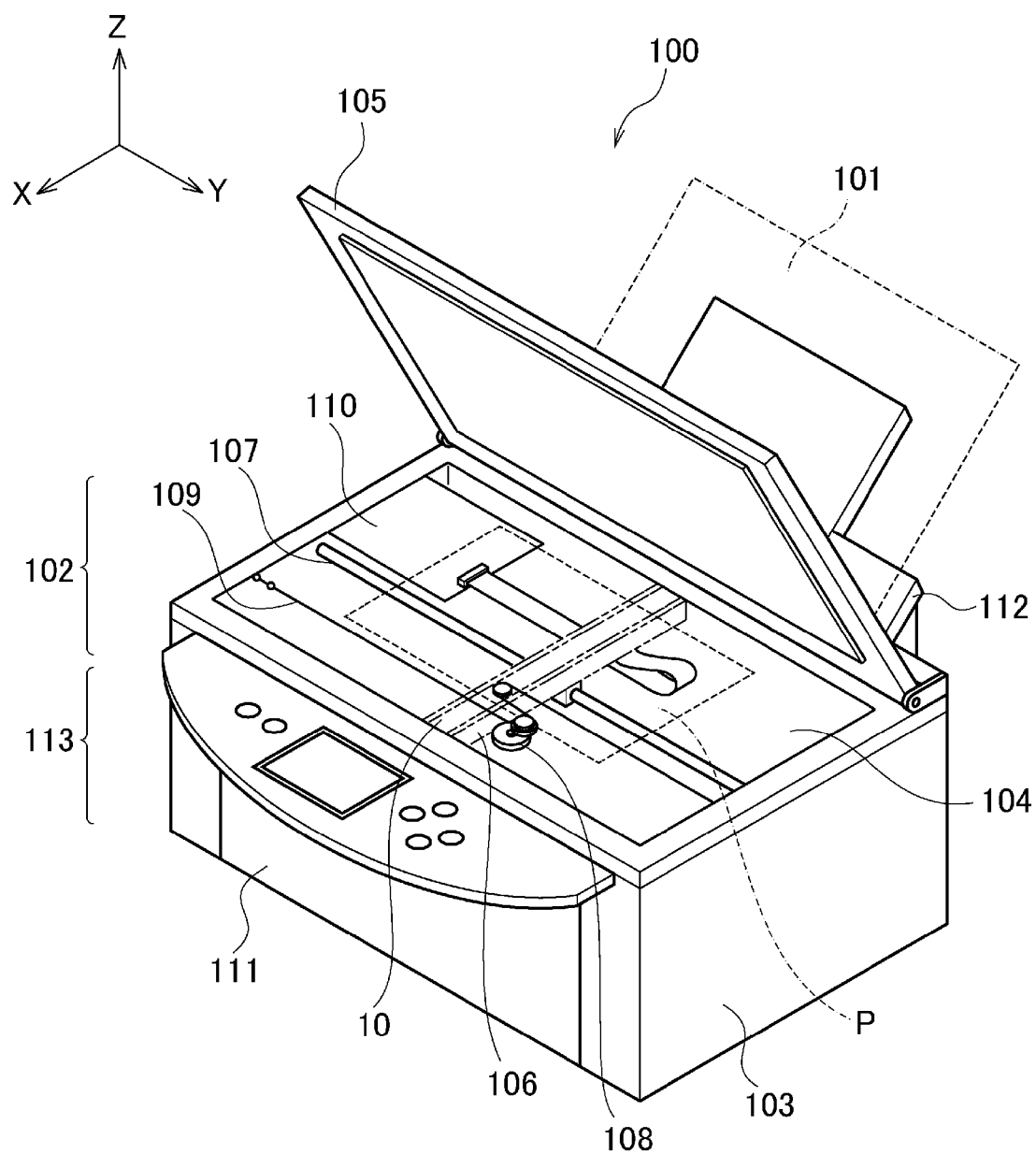
FIG. 2 is a perspective view illustrating an appearance of an MFP 100.

First, a structure of a multifunction printer (MFP), which is an example of an image reading apparatus or an image forming apparatus according to this embodiment, is described with reference to FIG. 2. FIG. 2 is a perspective view illustrating an appearance of an MFP 100. As illustrated in FIG. 2, the MFP 100 includes an image reading portion 102 as image reading means for reading reflected light from the original P, and an image forming portion 113 as image forming means for forming (printing) an image of the original P on a sheet 101 (recording sheet) as a recording medium.

The image reading portion 102 has a function of what is called an image scanner, and is configured as follows, for example. The image reading portion 102 is provided with a casing 103, a platen glass 104 composed of a transparent plate made of glass as an original placing part, a platen cover 105 provided with the casing 103 to freely open and close in a manner to cover the original P.

Inside the casing 103, an image sensor unit 10 provided with an illumination device, a holding member 106, an image sensor unit slide shaft 107, image sensor unit drive motor 108, a wire 109, a signal processing portion 110, a collector unit 111, a sheet supply tray 112 and the like are stored.

The image sensor unit 10 is, for example, a contact image sensor (CIS) unit. A holding member 106 holds the image sensor unit 10 in a manner to surround it. The image sensor unit slide shaft 107 guides the holding member 106 along the platen glass 104 in the sub-scanning direction. The image sensor unit drive motor 108 is a moving portion that relatively moves the image sensor unit 10 and the original P, and, more specifically, moves the wire 109 attached to the holding member 106. The collector unit 111 is provided with the casing 103 in a freely opening and closing manner, and collects the printed sheet 101. The sheet supply tray 112 stores the sheet 101 having a predetermined size.

In the image reading portion 102 configured as described above, the image sensor unit drive motor 108 moves the image sensor unit 10 along the image sensor unit slide shaft 107 in the sub-scanning direction. In this event, the image sensor unit 10 optically reads the original P mounted on the platen glass 104, and converts the image into an electric signal, thereby performing an image reading operation.

Figure 3:
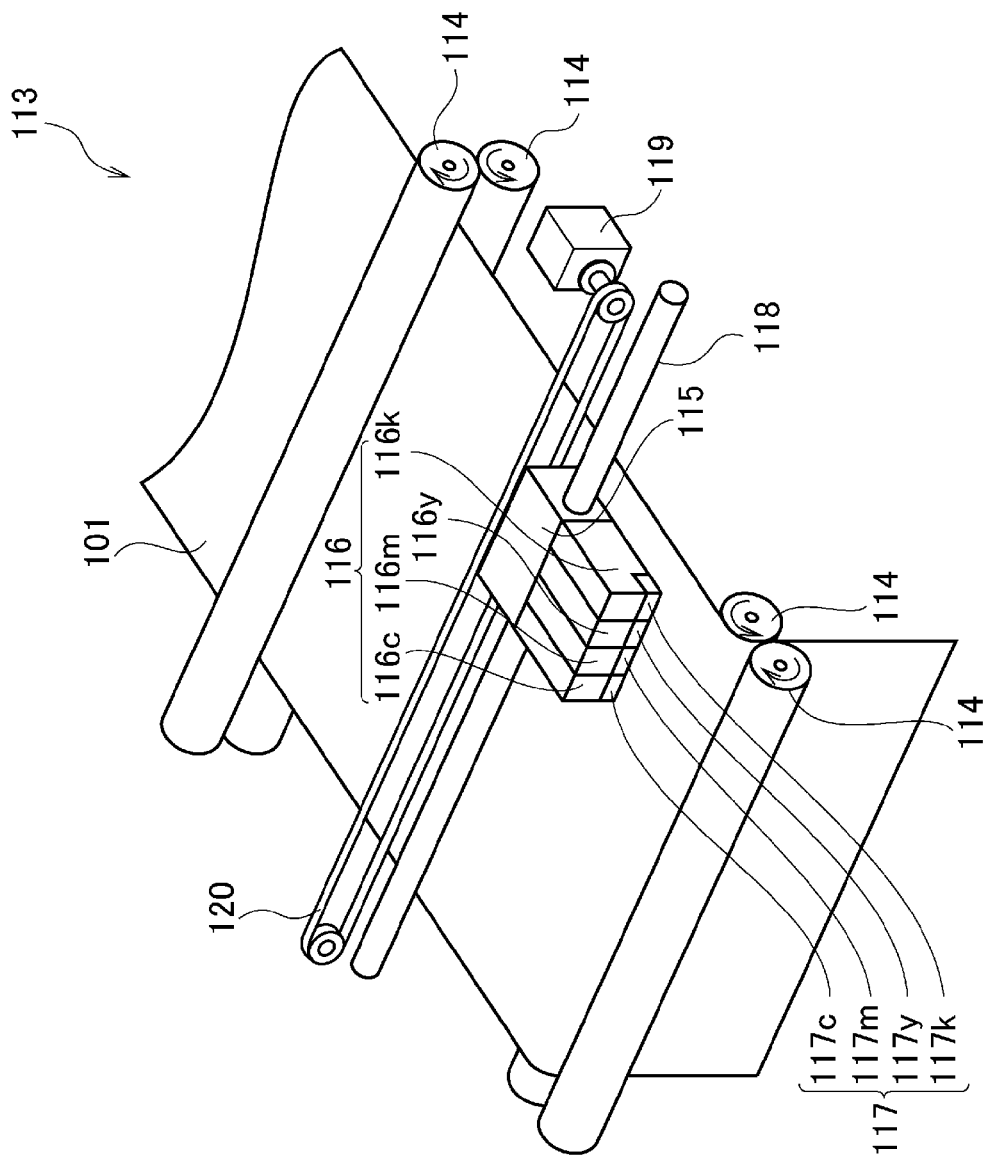
FIG. 3 is a schematic view illustrating the structure of an image forming portion 113.

FIG. 3 is a schematic view illustrating the structure of the image forming portion 113.

The image forming portion 113 forms the image read by the image sensor unit 10, on a recording medium. The image forming portion 113 has a function of what is called a printer, and is configured as follows, for example. The image forming portion 113 is housed in the casing 103, and provided with conveyor rollers 114 and a recording head 115, as illustrated in FIG. 3. The recording head 115 is constituted by ink tanks 116 (116c, 116m, 116y, 116k) provided with, for example, cyan C, magenta M, yellow Y and black K inks, and discharge heads 117 (117c, 117m, 117y, 117k) provided with the respective ink tanks 116. The image forming portion 113 has a recording head slide shaft 118, a recording head drive motor 119, and a belt 120 attached to the recording head 115.

In the image forming portion 113 configured as described above, the sheet 101 supplied from the sheet supply tray 112 is conveyed by the conveyor roller 114 to a recording position. The recording head drive motor 119 mechanically moves the belt 120, whereby the recording head 115 moves along the recording head slide shaft 118 while printing the sheet 101 based on the electric signal. After the operation described above is repeated until the end of printing, the printed sheet 101 is ejected to the collector unit 111 by the conveyor roller 114.

As the image forming portion 113, the ink jet image forming apparatus has been described. Alternatively, the portion may be any of types including electrophotographic, thermal transfer, and dot impact types.

Figure 4:
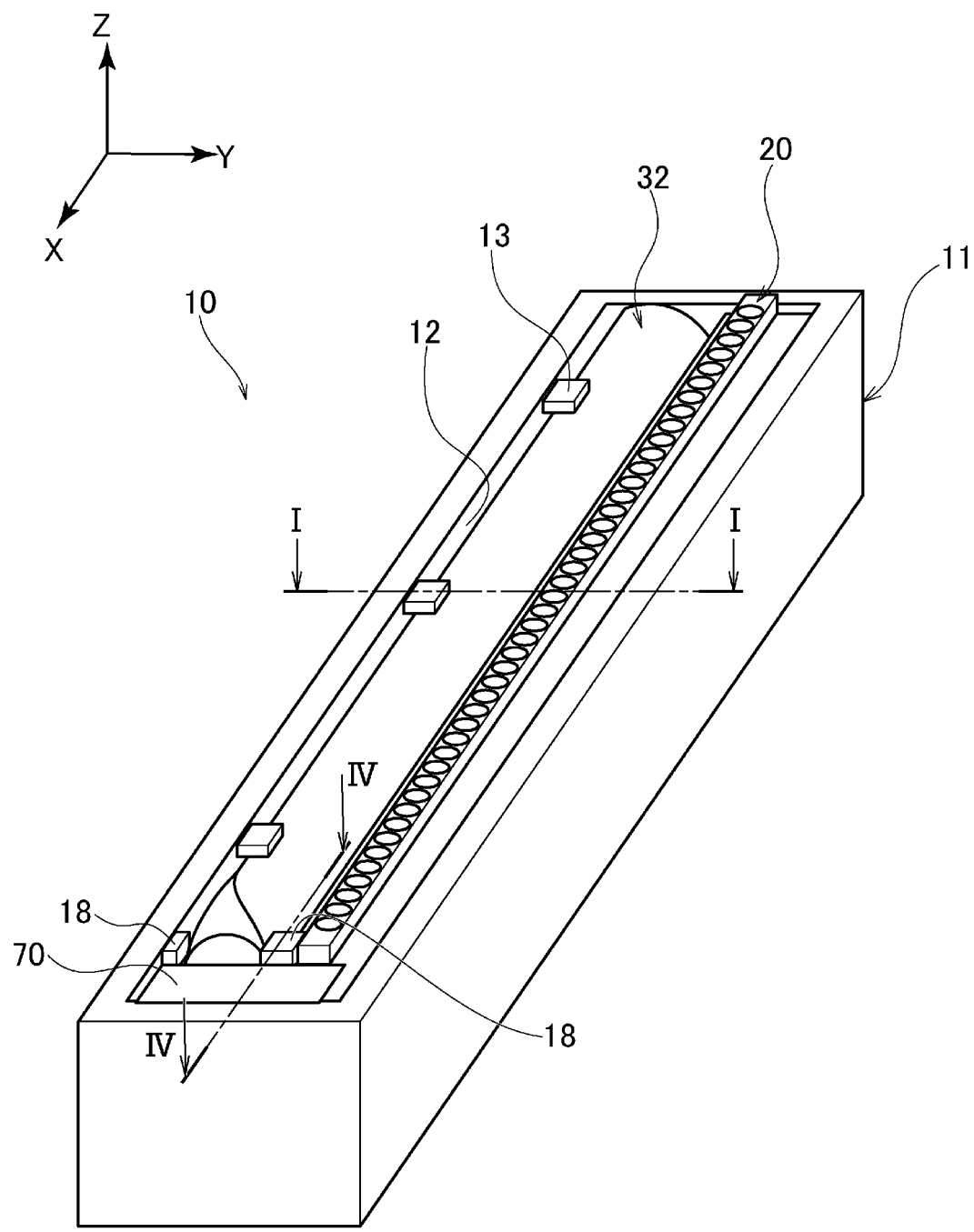
FIG. 4 is a perspective view of an appearance of an image sensor unit 10.
Figure 5:
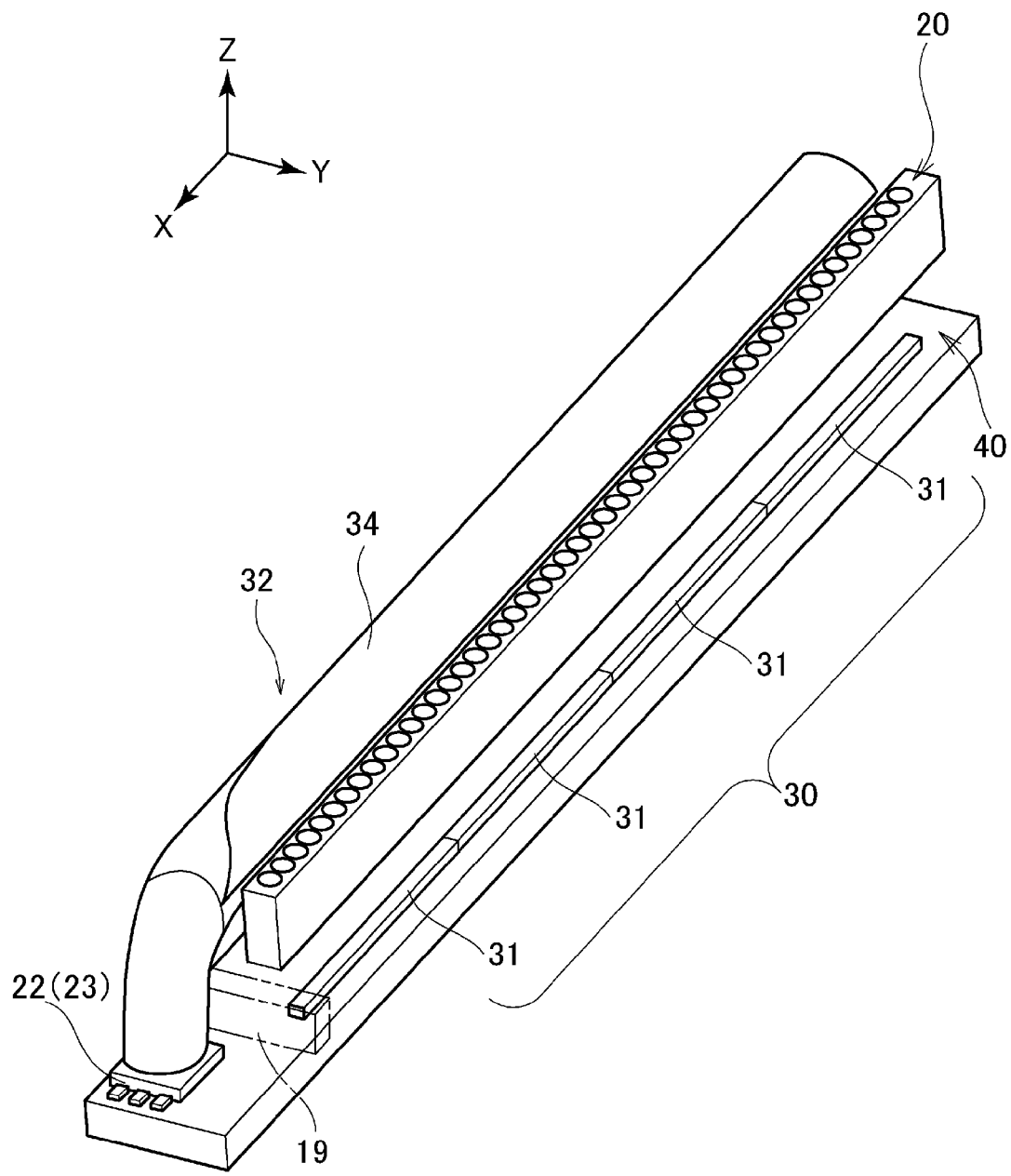
FIG. 5 is a schematic exploded view of the image sensor unit 10.
Figure 6:
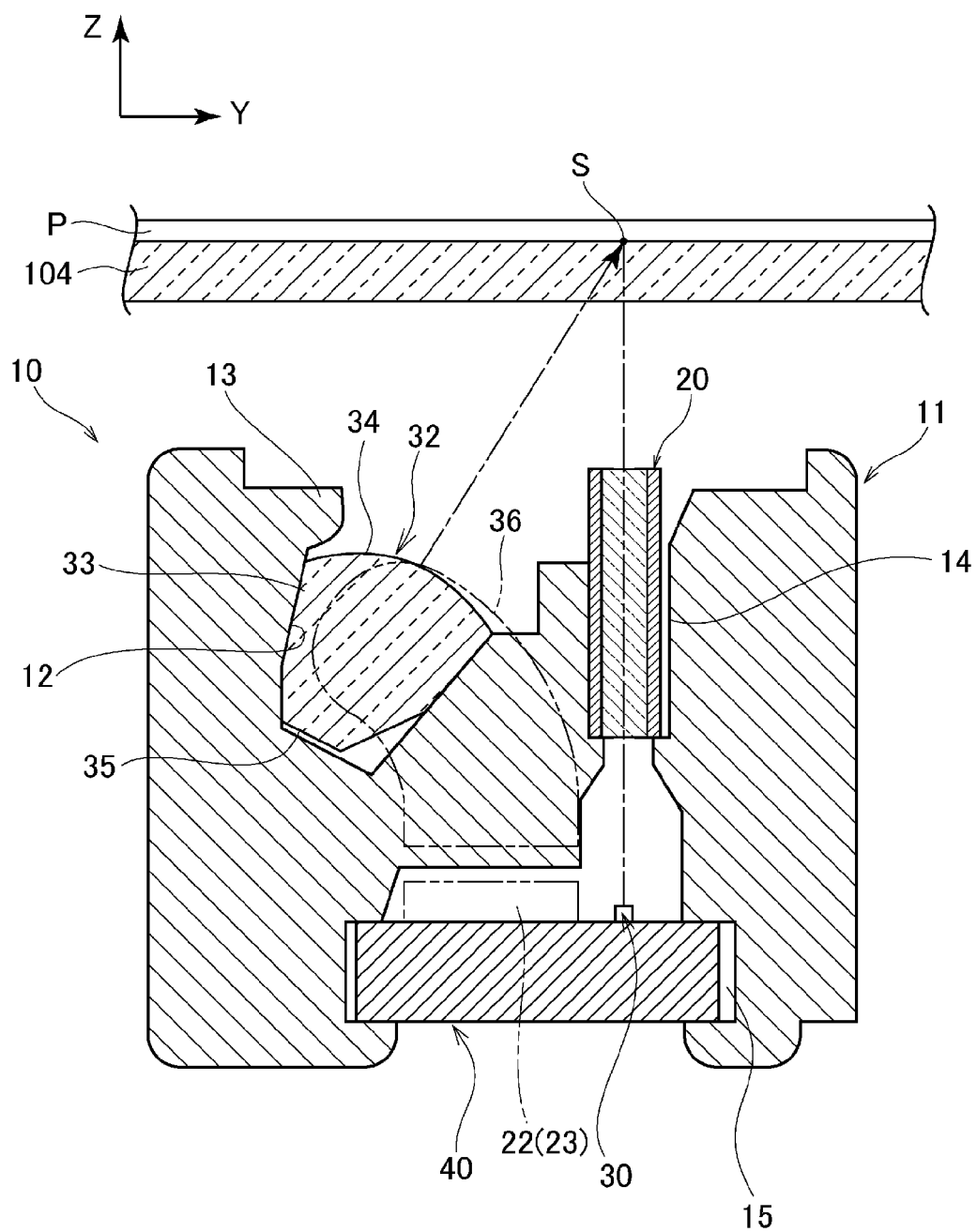
FIG. 6 is a sectional view taken along line I-I illustrated in FIG. 4.

Next, the image sensor unit 10 of this embodiment is described with reference to FIGS. 4, 5 and 6. FIG. 4 is a perspective view of the appearance of the image sensor unit 10. FIG. 5 is a schematic exploded view of the image sensor unit 10. FIG. 6 is a sectional view taken along line I-I illustrated in FIG. 4.

The image sensor unit 10 has a schematic appearance of a rectangular solid having a longitudinal direction aligned with the main-scan direction.

The image sensor unit 10 is provided with a frame 11, a light condenser 20, a light source 22, an image sensor 30, a light guide 32, a circuit board 40 and the like. Among the configuration components described above, the light source 22 and the light guide 32 function as an illumination device. Further, among the configuration components, the frame 11, the light condenser 20, the image sensor 30, the light guide 32, and the circuit board 40 are formed to have lengths according to a dimension in the main-scan direction of the original P to be read.

The frame 11 is a casing formed in a rectangular solid having a longitudinal direction aligned with the main-scan direction. The frame 11 houses each of the configuration components, which are positioned in the frame. Concretely, as illustrated in FIG. 6, in the frame 11, a light guide housing portion 12, a light condenser housing portion 14, and a board housing portion 15 are formed in the main-scan direction.

The light guide housing portion 12 houses the light guide 32, and has a snap-fit claw part 13 at a part of this portion.

The light condenser housing portion 14 is formed adjacent to the light guide housing portion 12, and houses the light condenser 20. The board housing portion 15 is formed at a lower part of the frame 11, and houses the circuit board 40. The frame 11 is made of a resin material that is black colored and has a light blocking property, for example. The resin material may be, for example, polycarbonate.

The light condenser 20 is an optical component that forms an image on the image sensor 30 with light from the original P, and is formed to have a longitudinal direction aligned with the main-scan direction. The light condenser 20 is housed in the light condenser housing portion 14 of the frame 11. For example, a rod-lens array that comprises a plurality of imaging elements (rod-lenses) of an erect equal magnification imaging type linearly arranged in the main-scan direction is used as the light condenser 20. In this connection, it is essential only that the light condenser 20 can form an image on the image sensor 30 with the reflected light. This condenser is not limited to the rod-lens array, but may be an optical component, such as a micro-lens array, having publicly known various light condensing functions.

The light source 22 emits light, whereby the light passes through the light guide 32 and is emitted to the original P.

Figure 7A:
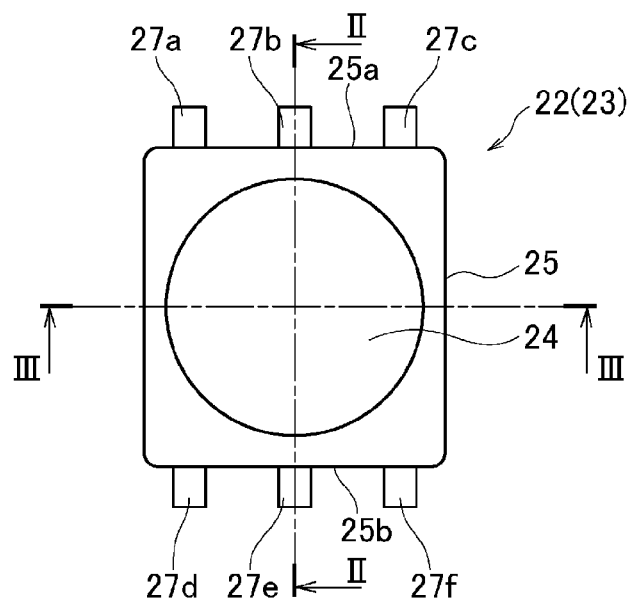
FIG. 7A is a plan view of the LED package 23.
Figure 7B:
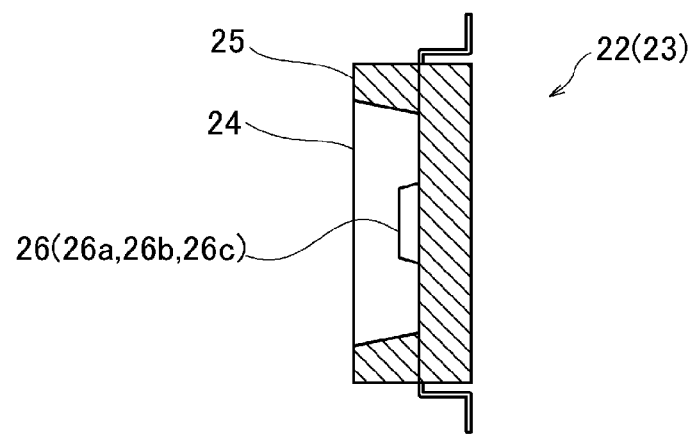
FIG. 7B is a sectional view taken along line II-II illustrated in FIG. 7A.
Figure 7C:
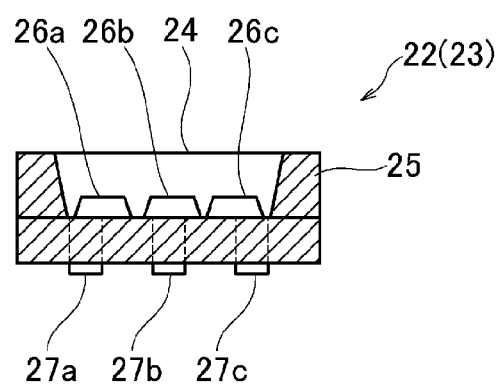
FIG. 7C is a sectional view taken along line III-III illustrated in FIG. 7A.

FIG. 7A is a plan view of the light source 22. FIG. 7B is a sectional view taken along line II-II illustrated in FIG. 7A. FIG. 7C is a sectional view taken along line III-III illustrated in FIG. 7A.

The light source 22 of this embodiment may be what is called a top view type surface-mounted LED package 23 in which a light emitting element is embedded on a light emitting surface 24. The LED package 23 includes a rectangular casing 25 in which an LED chip 26 as a light emitting portion is arranged. The LED package 23 may include a plurality of (three in this case) LED chips 26 (26a, 26b, 26c) having emission wavelengths of red, green and blue, for example. The LED package 23 has a plurality of (six in this case) terminals 27 (27a to 27f) that extend from external lines 25a, 25b on opposite two sides among the external lines constituted by the four sides of the casing 25. In this embodiment, the terminals 27a to 27c are cathode terminals electrically connected to the respective LED chips 26a to 26c, and the terminals 27d to 27f are anode terminals shared by the respective LED chips 26a to 26c.

Figure 1:
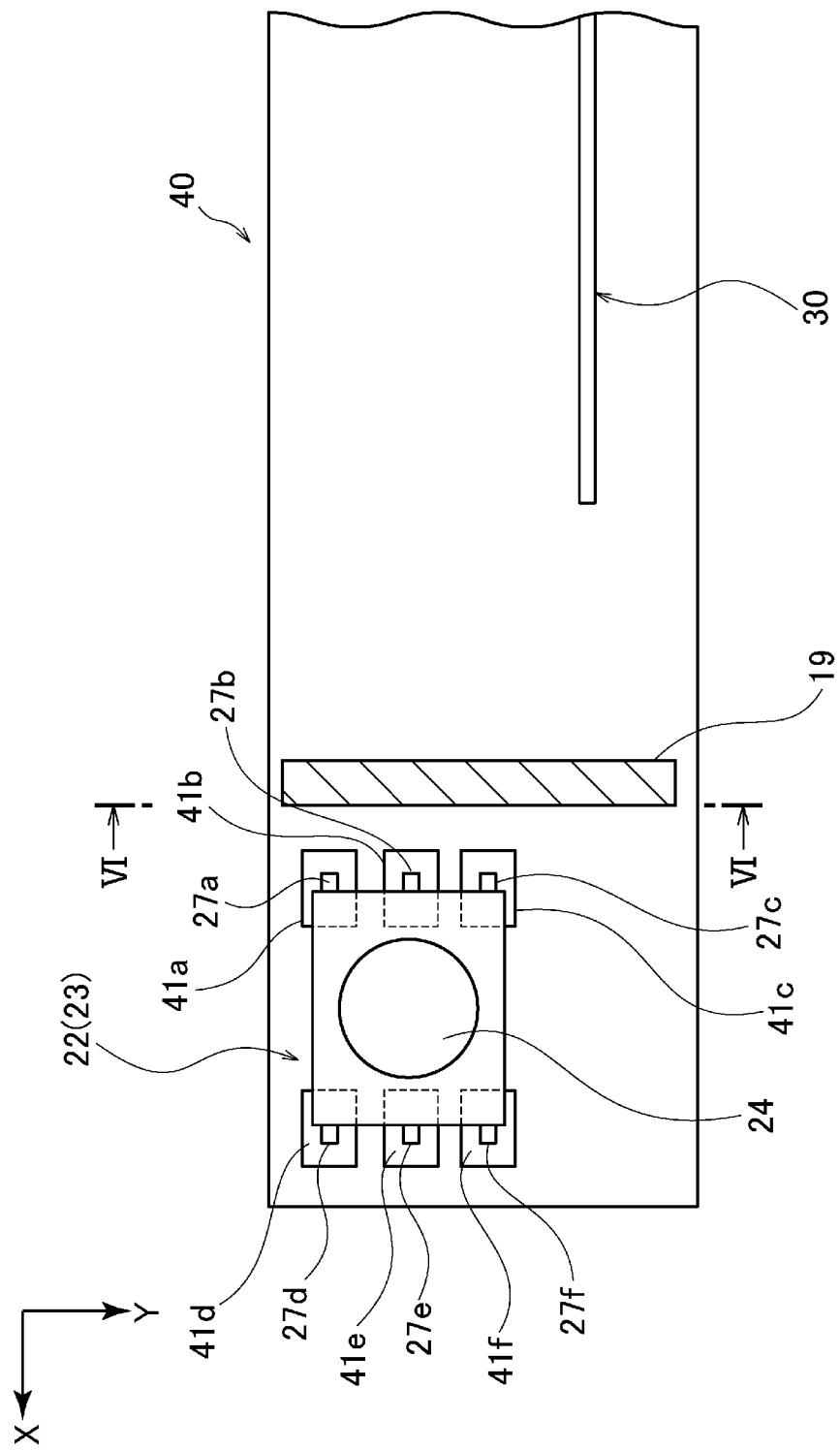
FIG. 1 is a view illustrating the state in which an LED package 23 is mounted on a circuit board 40.

FIG. 1 is a view illustrating the state in which the LED package 23 is mounted on the circuit board 40, and is a sectional view taken along line V-V of FIG. 9, which will be described later, and viewed in a direction orthogonal to the mounting surface of the circuit board 40. As illustrated in FIG. 1, the LED package 23 of this embodiment is mounted on one end in the main-scan direction of the circuit board 40. On the circuit board 40, pads 41a to 41f are formed in an exposed manner. The LED package 23 is fixed with the terminals 27a to 27f being soldered to the respective pads 41a to 41f of the circuit board 40.

In the case of applying the image sensor unit 10 to an apparatus (a paper sheet discriminating apparatus, which is an example of the image reading apparatus) that authenticates a bill and the like, the LED package 23 may include an LED chip having an emission wavelength of infrared light, ultraviolet light or the like, for example.

The image sensor 30 receives light reflected by the original P and focused by the light condenser 20, and converts the light into an electric signal. The image sensor 30 is arranged on an extended line of the optical axis of the light condenser 20. The image sensor 30 is mounted such that a predetermined number of image sensor ICs 31 constituted by a plurality of light receiving elements (photo-electric conversion elements) in conformity with the reading resolution of the image sensor unit 10 are linearly arranged in the main-scan direction on the mounting surface of the circuit board 40.

Only if the image sensor 30 has a configuration in which the light receiving elements are linearly arranged, these elements may be arranged on a plurality of lines, for example, in a staggered arrangement. Further, it is essential only that the image sensor 30 can convert the light reflected by the original P into the electric signal. Various types of image sensor ICs, which are publicly known, may be adopted.

The light guide 32 linearizes the light emitted from the light source 22, and guides the light to the original P. The light guide 32 is housed in the light guide housing portion 12. The light guide 32 is made of an acrylic resin material, for example.

Figure 8:
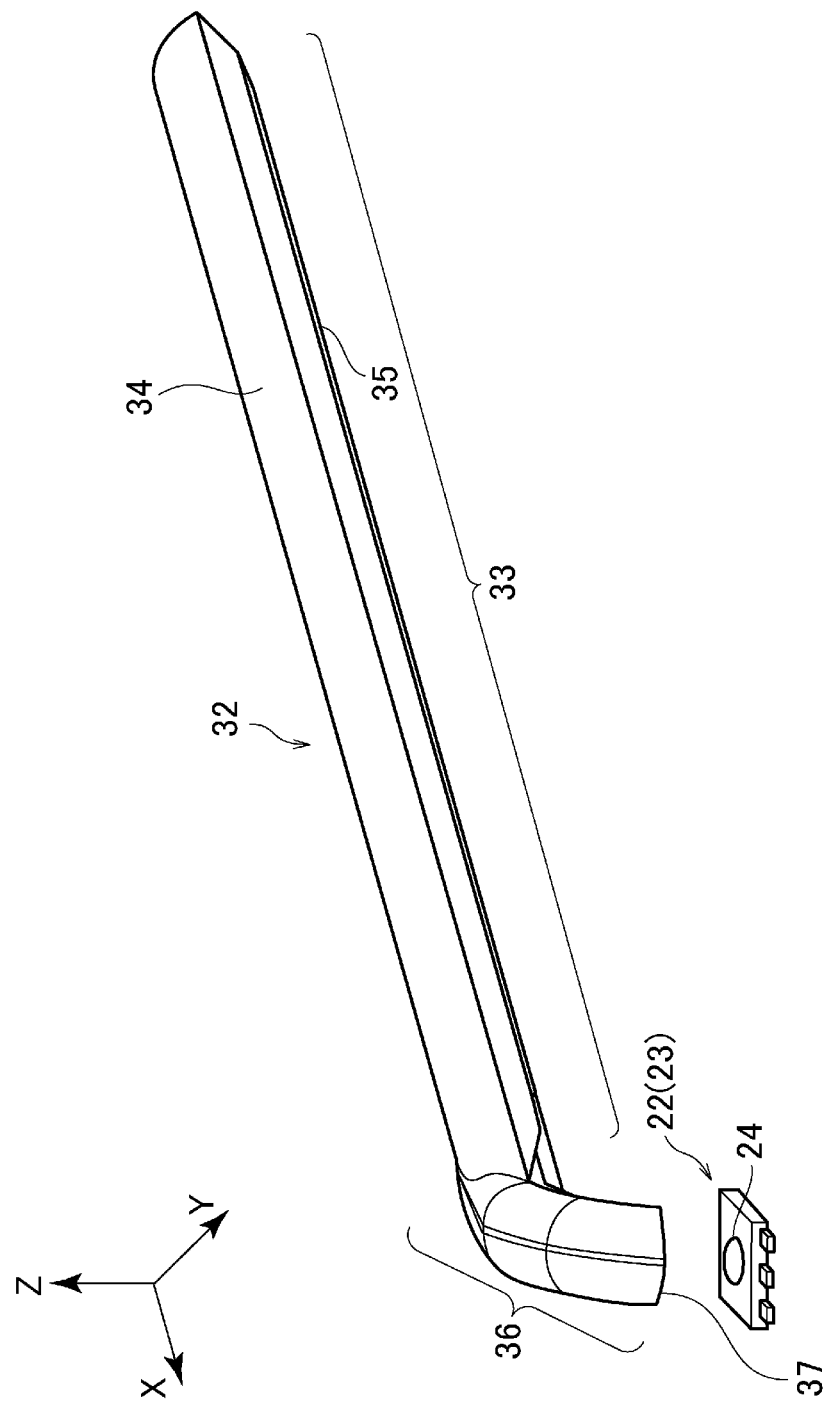
FIG. 8 is a perspective view illustrating the configuration of a light guide 32.

FIG. 8 is a perspective view illustrating the configuration of the light guide 32. The light guide 32 has a light emitter 33 formed in rod shape that is long in the main-scan direction, and a bend portion 36 formed to be bent from one end on one side of the light emitter 33.

The light emitter 33 includes an emission surface and a diffusing surface 35 in the main-scan direction. The emission surface 34 is formed at a position facing the original P, and the diffusing surface 35 is formed on a surface opposite to the emission surface 34. The emission surface 34 is a surface from which linear light is emitted toward the original P. As illustrated in FIG. 6, the emission surface 34 is formed in a curved surface convex in the direction toward a reading line S for the original P so as to collect light on the reading line S. The diffusing surface 35 is a surface by which light is reflected and diffused in the light emitter 33. On the diffusing surface 35, a pattern shape is formed by silk screen printing, for example.

The other surfaces of the light emitter 33 function as respective reflection surfaces.

The bend portion 36 is a portion that guides light emitted from the light source 22 to the light emitter 33. The bend portion 36 is formed to be bent continuously from the one end on one side of the light emitter 33 toward the light emitting surface 24 of the LED package 23 mounted on the circuit board 40. The end face of the bend portion 36 is an incident surface 37 on which light emitted from the LED package is incident. The incident surface 37 faces the light emitting surface 24 of the LED package at an interval. Further, the bend portion 36 is also bent from the one end of the light emitter 33 in the sub-scan direction. That is, as illustrated in FIG. 6, the bend portion 36 indicated by chain double-dashed lines is bent so as to deviate from the light emitter 33 toward the light condenser 20.

The circuit board 40 is formed to have a planar shape whose longitudinal direction is aligned with the main-scan direction. The circuit board 40 is housed in the board housing portion 15 of the frame 11. The circuit board 40 may be, for example, a glass epoxy board. The circuit board 40 has one surface that serves as a mounting surface on which the LED package 23 and the image sensor 30 are mounted. Concretely, on the one surface of the circuit board 40 in the main-scan direction, the LED package 23 is mounted, and the image sensor 30 is mounted linearly in the main-scan direction. On the mounting surface of the circuit board 40, a driving circuit and the like for causing the LED chips 26 of the LED package 23 to emit light are mounted.

Next, the state in which the light guide 32 is housed in the frame 11 is described with reference to FIG. 9.

FIG. 9 is a sectional view taken along line IV-IV illustrated in FIG. 4.

As illustrated in FIG. 9, the frame 11 has an inter-room wall 16 that separates the light guide housing portion 12 and the board housing portion 15 from each other. At a part of the inter-room wall 16 above the LED package 23, an opening 17 into which a portion including the incident surface 37 of the bend potion 36 is inserted is formed. Further, the frame 11 has a boundary wall 18 in the light guide housing portion 12 at a position corresponding to the boundary between the light emitter 33 and the bend potion 36 of the light guide 32. The inter-room wall and the boundary wall 18 prevent a part of light that does not incident on the incident surface 37 in the light emitted by the LED package 23 from directly reaching the light guide housing portion 12.

Further, the frame 11 is provided with a block component 70 so as to block an upper part of the light guide housing portion 12 that houses the bend potion 36 of the light guide 32. The block component may be, for example, a black-colored resin material having a planar or sheet shape. The block component 70 prevents leakage, to the outside of the frame, of a part of light having a small incident angle when being incident on an outer surface of the bend portion 36 and passing through the outer surface of the bend portion 36 in the light incident on the incident surface 37 from the LED package 23.

The frame 11 has a light blocking portion 19 between the LED package 23 and the image sensor 30 in the board housing portion 15. The light blocking portion 19 is formed to protrude from the inter-room wall 16 toward the circuit board 40. The lower surface of the light blocking portion 19 of this embodiment is in contact with the mounting surface of the circuit board 40.

As illustrated in FIG. 1, the light blocking portion 19 is formed in the sub-scan direction of the circuit board 40 so as to separate the LED package 23 and the image sensor 30 from each other. Accordingly, the light blocking portion 19 blocks light that is not to pass through the light guide 32 and is to be received by the image sensor 30 in the light emitted from the LED package 23.

Next, an operation of reading an image of the original P in the image sensor unit 10 configured as described above is described.

As illustrated in FIG. 9, light emitted from the LED chips 26 of the LED package 23 in sequence is incident on the incident surface 37 of the bend potion 36, subjected to total reflection by the outer surface of the bend portion as indicated by the arrows in FIG. 9, and guided into the light emitter 33. As illustrated in FIG. 6, the light guided into the light emitter 33 is diffused by the diffusing surface 35, and emitted from the opposite emission surface 34 toward the lower surface of the original P as indicated by the arrow. Accordingly, the light is emitted linearly over the reading line S on the original P. The light is reflected by the original P, whereby an image is formed on the image sensor 30 with the light through the light condenser 20. The image sensor 30 converts the image-formed light into an electric signal, thereby allowing the image on the lower surface of the original P to be read.

The image sensor 30 reads one scan line of light, whereby the reading operation for one scan line in the main-scan direction on the original P is completed. After the reading operation for one scan line is completed, the image sensor unit 10 is relatively moved in the sub-scan direction while a reading operation for the next one scan line is performed in a manner similar to the above described operation. The reading operation for every one scan line is repeated while the image sensor unit 10 is moved in the sub-scan direction, whereby the entire surface of the original P is sequentially scanned and the image is read by means of the reflected light.

As described above, the frame 11 of this embodiment has the light blocking portion 19 formed between the LED package 23 and the image sensor 30 toward the mounting surface of the circuit board 40. Accordingly, the light blocking portion 19 blocks light that is not to pass through the light guide 32 in the light emitted from the LED package 23, thereby preventing stray light from being received by the image sensor 30.

However, although the light blocking portion 19 was provided, a part of light emitted from the LED package 23 and reached the board housing portion 15 and was received by the image sensor 30 as stray light in some cases. As a result of discussions, it was determined that such stray light was caused by the following two factors.

The first factor is that a gap is formed between the light blocking portion 19 and the mounting surface of the circuit board 40. That is, the part of light emitted from the LED package 23 reached the board housing portion 15 through this gap.

The second factor is that a gap allowing light to easily pass is formed between conductive portions formed on the circuit board 40. That is, a part of light emitted from the LED package 23 passed through the gap between the conductive portions on the circuit board 40, entered the inside of the circuit board 40, propagated in the main-scan direction in the circuit board 40, and reached the board housing portion 15.

Hereinafter, a circuit board 50 as Comparison Example 1 that tends to cause stray light, and a circuit board 60 as an invented example that is resistant to causing stray light are described with reference to the drawings.

Figure 10A:
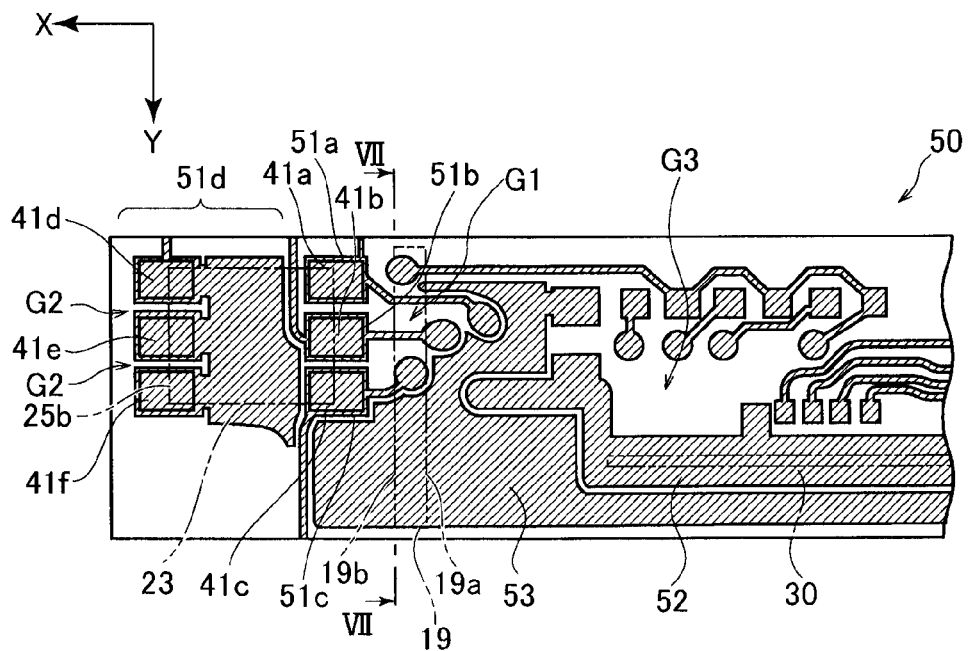
FIG. 10A is a view illustrating a circuit pattern of a circuit board 50 of a Comparison Example 1.
Figure 10B:
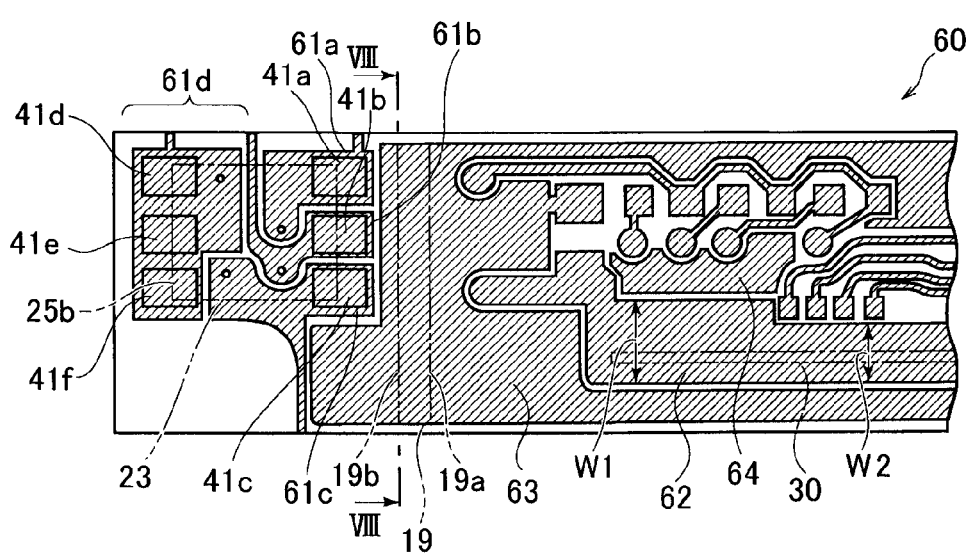
FIG. 10B is a view illustrating a circuit pattern of a circuit board 60 of an invented example.

FIG. 10A is a view illustrating the circuit pattern of the circuit board 50 of Comparison Example 1. FIG. 10B is a view illustrating the circuit pattern of the circuit board 60 of the invented example. In FIGS. 10A and 10B, the respective circuit patterns are hatched, while the LED packages 23, the image sensors 30 and the light blocking portions 19 are indicated by chain double-dashed lines. In this connection, the chain double-dashed lines for the light blocking portion 19 indicate external lines of the lower surface of the light blocking portion 19. Between the two external lines in the sub-scan direction, the line nearer to the image sensor 30 is the external line 19a and the line nearer to the LED package 23 is the external line 19b.

Figure 11A:
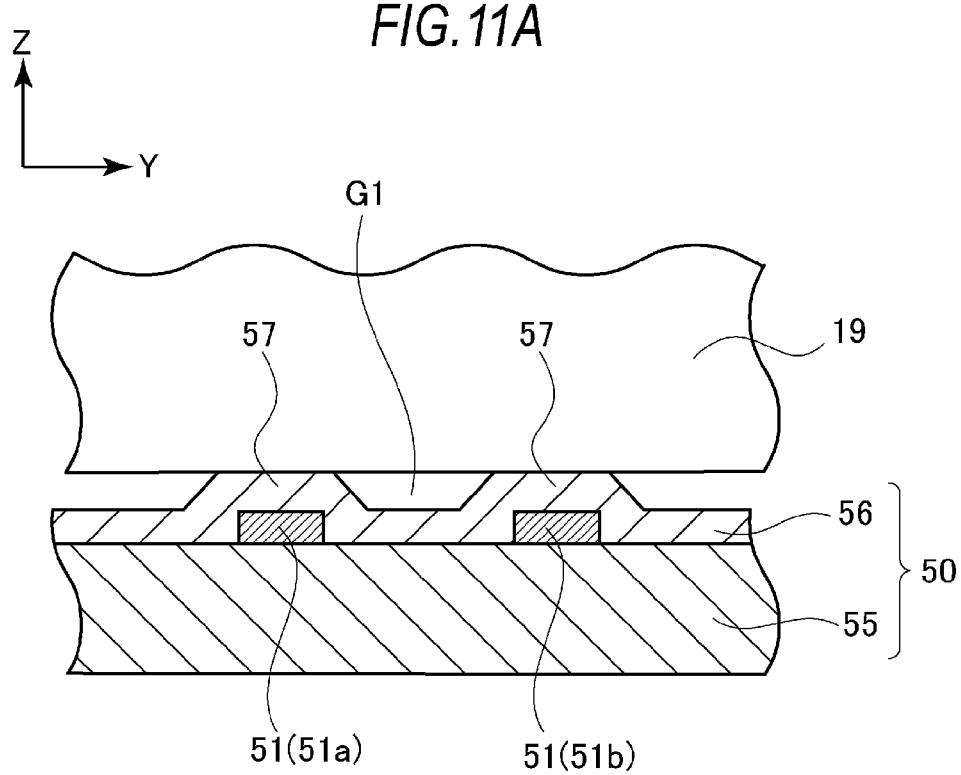
FIG. 11A is an enlarged sectional view of the circuit board 50 of Comparison Example 1 taken along line VII-VII illustrated in FIG. 10A.
Figure 11B:
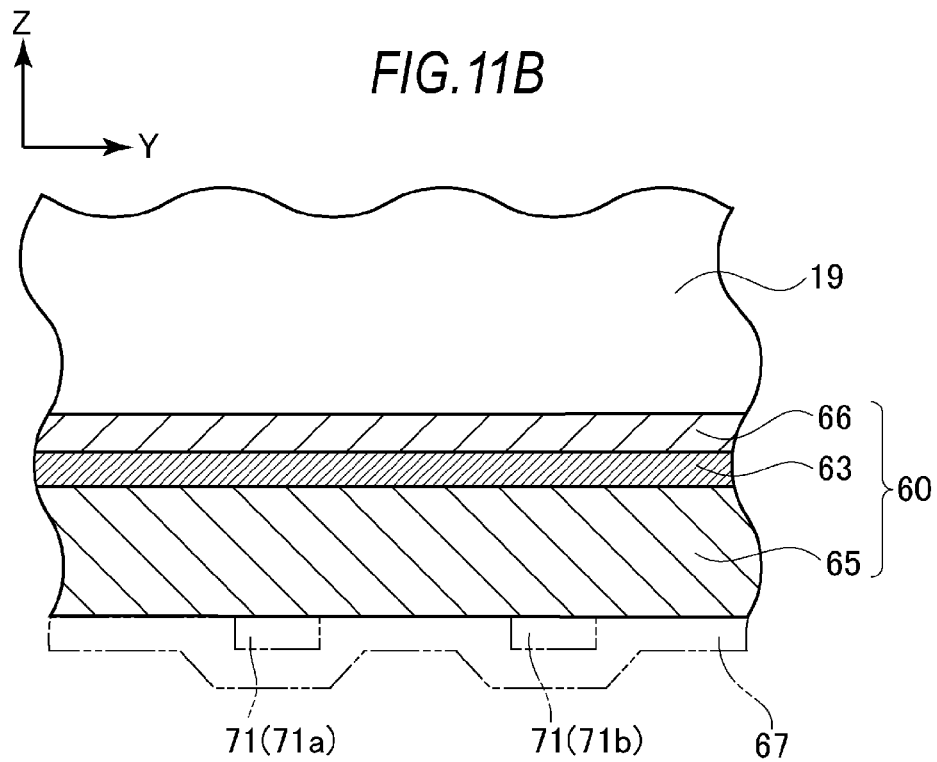
FIG. 11B is an enlarged sectional view of the circuit board 60 of the invented example taken along line VIII-VIII illustrated in FIG. 10B.

FIG. 11A is an enlarged sectional view of the circuit board 50 of the Comparison Example 1 taken along line VI-VI illustrated in FIG. 1 (corresponding to line VII-VII illustrated in FIG. 10A). FIG. 11B is an enlarged sectional view of the circuit board 60 of the invented example taken along line VI-VI illustrated in FIG. 1 (corresponding to line VIII-VIII illustrated in FIG. 10B).

First, the circuit board 50 that tends to cause stray light is described.

As illustrated in FIG. 10A, on the circuit board 50, light source conductive portions 51a to 51c and an anode conductive portion 51d are formed in a manner overlapping with the LED package 23. The light source conductive portions 51a to 51c are conducted with the respective pads 41a to 41c. The anode conductive portion 51d is conducted with the pads 41d to 41f. The light source conductive portions 51a to 51c each have a rectangular area and an area that extends from the rectangular area in the main-scan direction and reaches a position of the light blocking portion 19 or a position beyond the light blocking portion 19 so as to be conducted with the driving circuit mounted around the image sensor 30.

Here, the light source conductive portions 51a to 51c and the anode conductive portion 51d are made of metal having a certain thickness, such as copper foil. Thus, irregularities occur in a direction orthogonal to the mounting surface between parts where the conductive portions are formed and parts where no conductive portion is formed.

As illustrated in FIG. 11A, the circuit board 50 is configured by stacking a substrate 55, the conductive portions 51 formed on the substrate 55, and a solder resist 56 that covers the conductive portion 51. The solder resist 56 covers the conductive portions 51, thereby forming respective convex portions 57 due to the thicknesses of the conductive portions 51.

As illustrated in FIG. 11A, if the convex portions 57 are in contact with the light blocking portion 19, a gap G1 occurs between the convex portions 57 that are adjacent to each other. In a plan view, the gap G1 extends in the main-scan direction, and intersects with the light blocking portion 19. Accordingly, on the circuit board 50 of Comparison Example 1, a part of light emitted from the LED package 23 passes through the gap G1, and reaches the board housing portion 15 (the first factor). In FIG. 9, the path of light reaching the board housing portion 15 owing to the first factor is indicated by a chain double-dashed arrow L1.

Further, as illustrated in FIG. 10A, the anode conductive portion 51d of the circuit board 50 has gaps G2 where no conductive portion is formed, between the pads 41d and 41e and the pads 41e and 41f.

Further, on the circuit board 50, a conductive portion 52 overlapping with the image sensor 30, and a conductive portion 53 disposed around the conductive portion 52 are formed. On the other hand, a gap G3 is formed at a part around the conductive portion 52 where no conductive portion is formed.

Accordingly, on the circuit board 50 of Comparison Example 1, a part of light that does not enter the light guide 32 in light emitted from the LED package 23 passes through the solder resist 56 of the circuit board 50 and subsequently enters the substrate 55 through the gaps G2 and the like. The light having entered the substrate 55 propagates in the main-scan direction, and is emitted from the gap G3 and the like around the image sensor 30, thereby reaching the board housing portion 15 (the second factor). In FIG. 9, the path of light reaching the board housing portion 15 owing to the second factor is indicated by a chain double-dashed arrow L2.

As described above, the circuit board 50 of Comparison Example 1 tends to cause stray light.

In this connection, on the circuit board 50 of Comparison Example 1, by using a black solder resist that prevents light from passing as the solder resist 56, the light emitted from the LED package 23 can be absorbed by the black solder resist 56, whereby it can become difficult to cause stray light. However, since the black solder resist is expensive, the cost of manufacturing the image sensor unit 10 increases. In this connection, in later-described inspection of stray light, the circuit board 50 that adopts the black solder resist is inspected as Comparison Example 2.

Next, as the invented example, the circuit board that adopts an inexpensive solder resist that allows light to pass but is resistant to causing stray light is described.

As illustrated in FIG. 10B, on the circuit board 60, light source conductive portions 61a to 61c and an anode conductive portion (terminal conductive portion) 61d are formed in a manner overlapping with the LED package 23. The light source conductive portions 61a to 61c are conducted with the respective pads 41a to 41c. The anode conductive portion 61d is conducted with the pads 41d to 41f. The light source conductive portions 61a to 61c each consist only of a rectangular area, and do not reach the light blocking portion 19.

On the circuit board 60 of the invented example, a conductive portion 63 continuously overlapping with the external lines 19a, 19b of the light blocking portion 19 in the sub-scan direction in a plan view is formed. Concretely, the conductive portion 63 is continuously formed in a wider area than the area of the light blocking portion 19 in a plan view. That is, on the circuit board 60, the conductive portion is formed flat at least in a range overlapping with the light blocking portion 19. Accordingly, a convex portion caused by the conductive portion 63 is not formed.

As illustrated in FIG. 11B, the circuit board 60 is configured by stacking a substrate 65, the conductive portions 63 formed on the substrate 65, and a solder resist 66 that covers the conductive portion 63. The solder resist 66 covers the conductive portion 63 and the surface is formed flat, thereby causing no gap. Therefore, the circuit board 60 of invented example can prevent any part of light emitted by the LED package 23 from passing between the circuit board 60 and the light blocking portion and reaching the board housing portion 15 (measures against the first factor). In this connection, by forming the conductive portion 63 in a wider area than the area of the light blocking portion 19, the light is blocked by the conductive portion 63 itself so as not to enter the substrate 65 and not to be emitted from the substrate 65.

Further, as illustrated in FIG. 10B, the anode conductive portion 61d on the circuit board 60 is formed continuously even between the pads 41d and 41e and the pads 41e and 41f. In other words, as illustrated in FIG. 10B, the anode conductive portion 61d tightly overlaps with the external line 25b of the LED package 23. Thus, unlike the circuit board 50 of Comparison Example 1, the circuit board 60 does not have the gap G2. As described above, any gap of the anode conductive portion 61d on the circuit board is eliminated, whereby even if a part of light emitted from the LED package 23 passes through the solder resist 66, the part of light is blocked by the anode conductive portion 61d that has no gap, and can be prevented from entering the inside of the substrate 65 (measures against the second factor).

Further, on the circuit board 60, a conductive portion 62 as a second conductive portion is formed so as to overlap with the image sensor 30. The conductive portion 62 is formed to have a larger width dimension (W1 indicated in FIG. 10B) in the sub-scan direction at a position nearer to the LED package 23 than the width dimension (W2 indicated in FIG. 10B) at a farther position. On the circuit board 60, a conductive portion 64 is formed around the conductive portion 62. The conductive portion 64 is formed at a position corresponding to the gap G3 in Comparison Example 1.

Thus, even if a part of light enters the substrate 65 and propagates in the main-scan direction, the light emitted from the substrate 65 is blocked by the conductive portions 62, 63, 64. In particular, the conductive portion 62 is formed to have a larger width dimension at the position nearer to the LED package 23 where the substrate 65 tends to emit light, whereby light that is to propagate in the substrate 65 and be emitted from the position nearer to the LED package 23 can be blocked and prevented from being received by the image sensor 30 (measures against the second factor).

As described above, according to the circuit board 60 of the invented example, stray light can be prevented from occurring even if the inexpensive solder resist that allows light to pass is used.

As described above, on the circuit board 60, the light source conductive portions 60a to 61c each consist only of the rectangular part and do not reach the light blocking portion 19, and therefore cannot be conducted with the driving circuit mounted around the image sensor 30. Thus, on the circuit board 60, conductive portions 71 that are conducted with the light source conductive portions 61a to 61c and the anode conductive portion 61d are formed on a lower surface that is the other surface.

FIG. 12 is a view in the same direction as that of FIG. 10B, and a view extracting only the conductive portions 71 formed on the lower surface of the circuit board 60. On the lower surface of the circuit board 60, light source conductive portions 71a to 71c and an anode conductive portion 71d are formed. The light source conductive portions 71a to 71c are conducted by via holes with the respective light source conductive portions 61a to 61c, and the anode conductive portion 71d is conducted by a via hole with the anode conductive portion 61d. The light source conductive portions 71a to 71c and the anode conductive portion 71d extend on the lower surface of the circuit board 60 and are conducted with the driving circuit mounted around the image sensor 30. That is, the light source conductive portions 71a to 71c and the anode conductive portion 71d are formed so as to intersect with the light blocking portion 19 in a plan view.

In FIG. 11B, the conductive portions 71 formed on the lower surface of the substrate 65 are indicated by chain double-dashed lines. As illustrated in FIG. 11B, the conductive portion 71 is covered with a solder resist 67 from the lower side.

As described above, the light source conductive portions 71a to 71c and the anode conductive portion 71d are formed on the lower surface of the circuit board 60, whereby convex portions due to the light source conductive portions 71a to 71c and the anode conductive portion 71d are formed on the lower surface of the circuit board 60. That is, the light source conductive portions 61a to 61c can be conducted with the driving circuit without forming any gap in an area on the mounting surface of the circuit board 60, the area overlapping with the light blocking portion 19.

<Inspection of Stray Light>

Next, occurrence of stray light is inspected for Comparison Examples 1 and 2 and the invented example.

In this connection, in Comparison Example 1 and the invented example, a typical green solder resist is used as the solder resist that allows light to pass. In Comparison Example 2, the black solder resist that is resistant to causing light to pass is used for the circuit board 50 of Comparison Example 1.

Here, the light source 22 is set such that the image sensor 30 outputs 200 mV and 1000 mV, and then incident light is blocked on the lens surface of the light condenser 20. Accordingly, if no stray light occurs, the output value of the image sensor 30 is zero. If stray light occurs, the output value of the image sensor 30 is greater than zero.

Figure 13A:
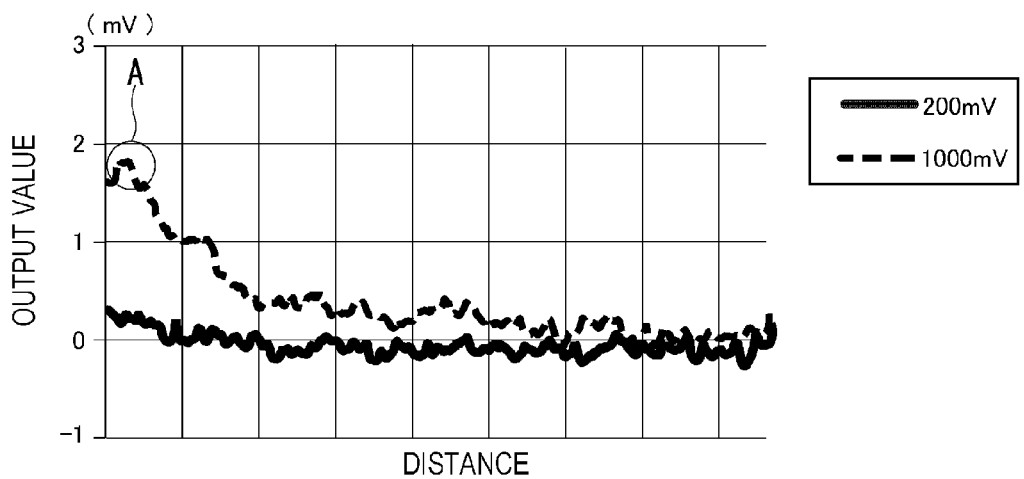
FIG. 13A is a graph illustrating occurrence of stray light in Comparison Example 1.
Figure 13B:
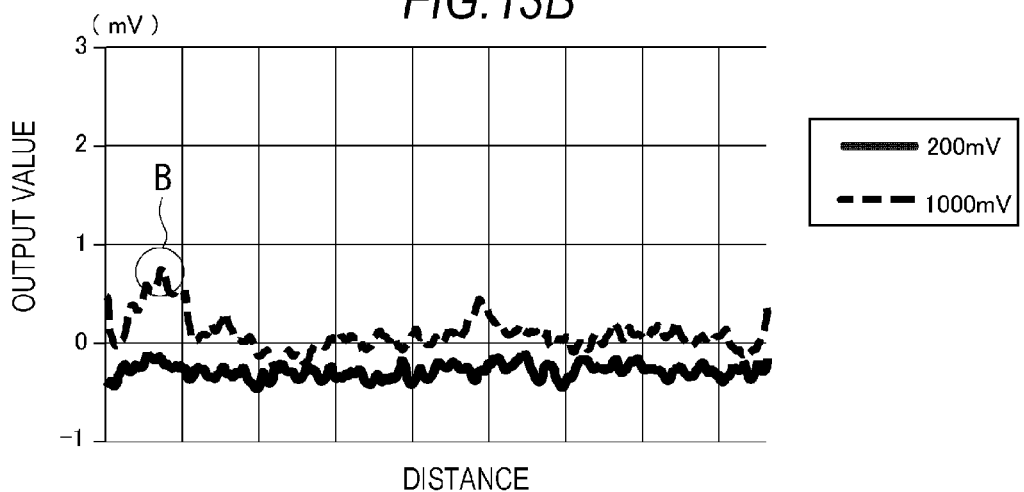
FIG. 13B is a graph illustrating occurrence of stray light in Comparison Example 2.
Figure 13C:
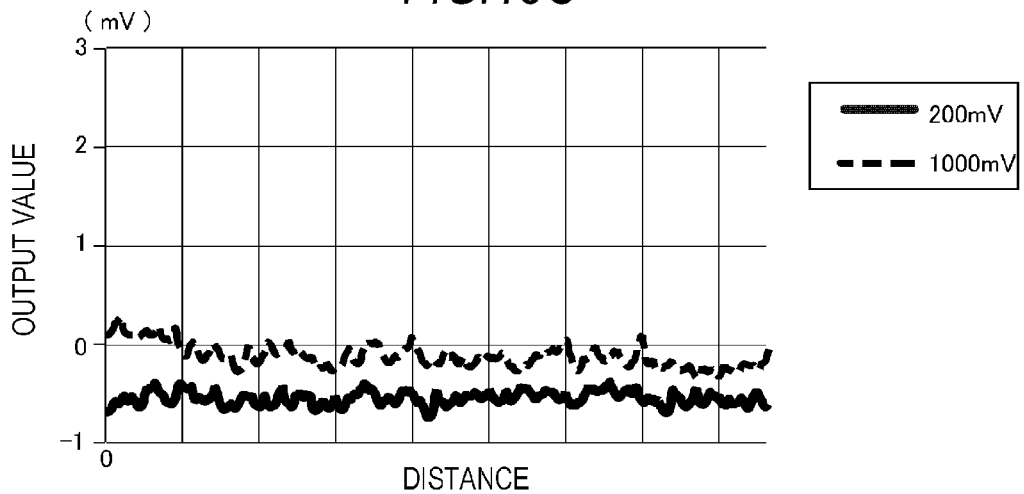
FIG. 13C is a graph illustrating occurrence of stray light in the invented example of a first embodiment.

FIG. 13A is a graph illustrating the output of Comparison Example 1. FIG. 13B is a graph illustrating the output of Comparison Example 2. FIG. 13C is a graph illustrating the output of the invented example. In each graph, the vertical axis indicates the output value (mV) of the image sensor 30, and the horizontal axis indicates the distance of the image sensor 30 from the light source 22 side. In this connection, in the graphs of FIGS. 13A to 13C, output values smaller than zero are caused by noise.

In Comparison Example 1 illustrated in FIG. 13A, if the light source is at 200 (mV), the output value is at about 0 (mV) irrespective of the distance of the image sensor 30. On the other hand, if the light source is at 1000 (mV), an output value of the image sensor 30 near the light source 22 is prominent (see the A portion illustrated in FIG. 13A) and is about 2 (mV). Thus, in Comparison Example 1, stray light occurs at the position near the light source 22.

Next, in Comparison Example 2 illustrated in FIG. 13B, if the light source is 200 (mV), the output value is about 0 (mV) irrespective of the distance of the image sensor 30. On the other hand, if the light source is at 1000 (mV), an output value of the image sensor 30 at a position near the light source 22 is prominent (see the B portion illustrated in FIG. 13B) and is about 1 (mV). Thus, in Comparison Example 2, stray light occurs at the position near the light source 22.

Lastly, in the invented example illustrated in FIG. 13C, the output value of the image sensor 30 is stable even in the cases of the light source at 200 (mV) and 1000 (mV). Therefore, in the invented example, stray light is prevented.

As described above, the configuration as in the invented example can prevent stray light that is to be from the light source 22 not through the light guide 32 and received by the image sensor 30, without using the expensive black solder resist.

Second Embodiment

In the first embodiment, the case where the light blocking portion 19 is in contact with the circuit board 40. In this embodiment, the case where a slight gap is formed between a light blocking portion 82 and a circuit board 40 is described.

Figure 14:
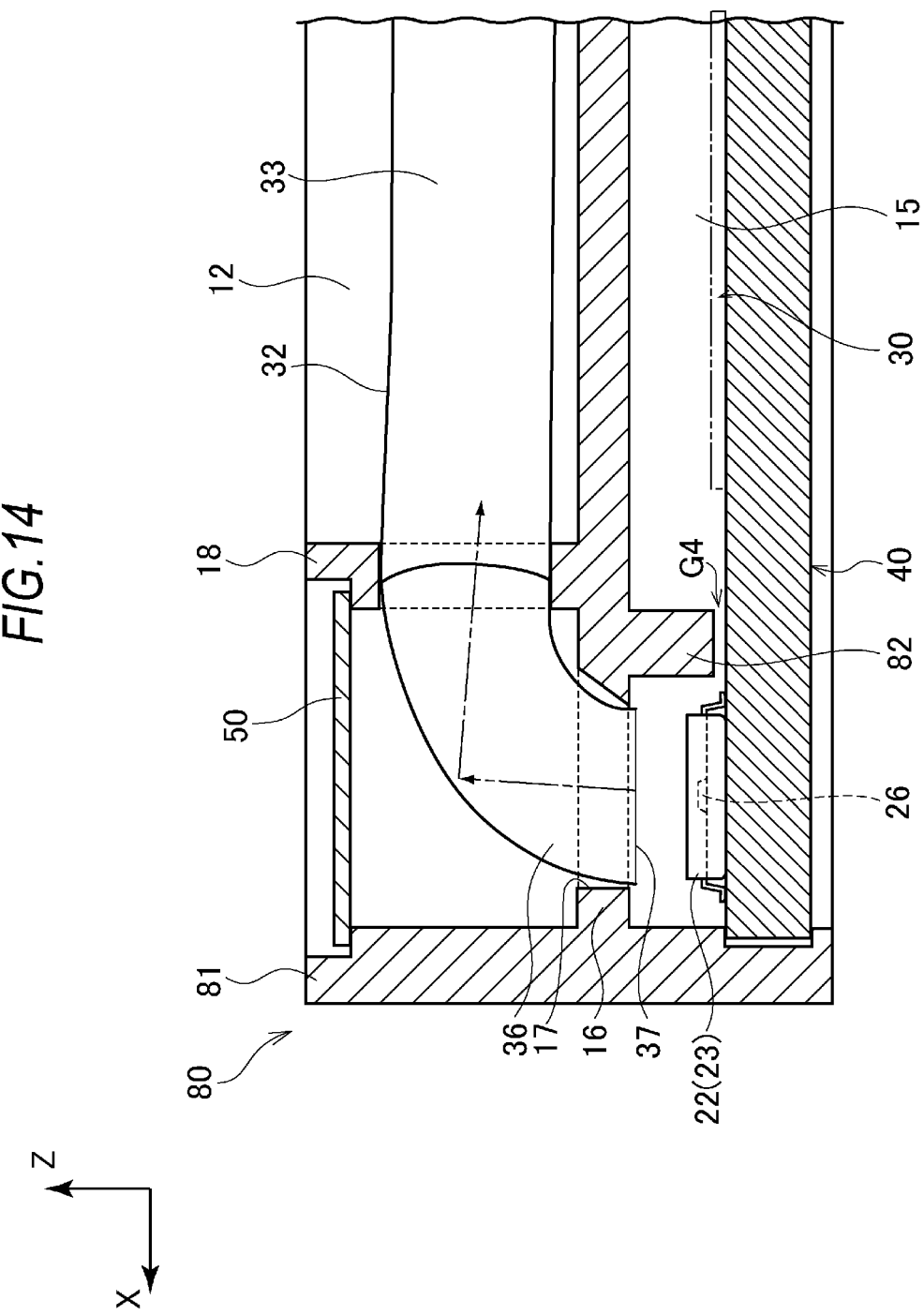
FIG. 14 is a sectional view illustrating a configuration of an image sensor unit 80 according to a second embodiment.

FIG. 14 is a sectional view illustrating a configuration of an image sensor unit 80 according to a second embodiment. In this connection, the same symbols are assigned to parts common to those of the first embodiment, and description of the parts will be omitted.

A frame 81 of the image sensor unit 80 has a light blocking portion 82 between the LED package 23 and the image sensor 30. The light blocking portion is formed to protrude from the lower surface of the inter-room wall 16 toward the circuit board 40. In this embodiment, a slight gap G4 is formed between the lower surface of the light blocking portion 82 and the mounting surface of the circuit board 40.

<Inspection of Stray Light>

Figure 15A:
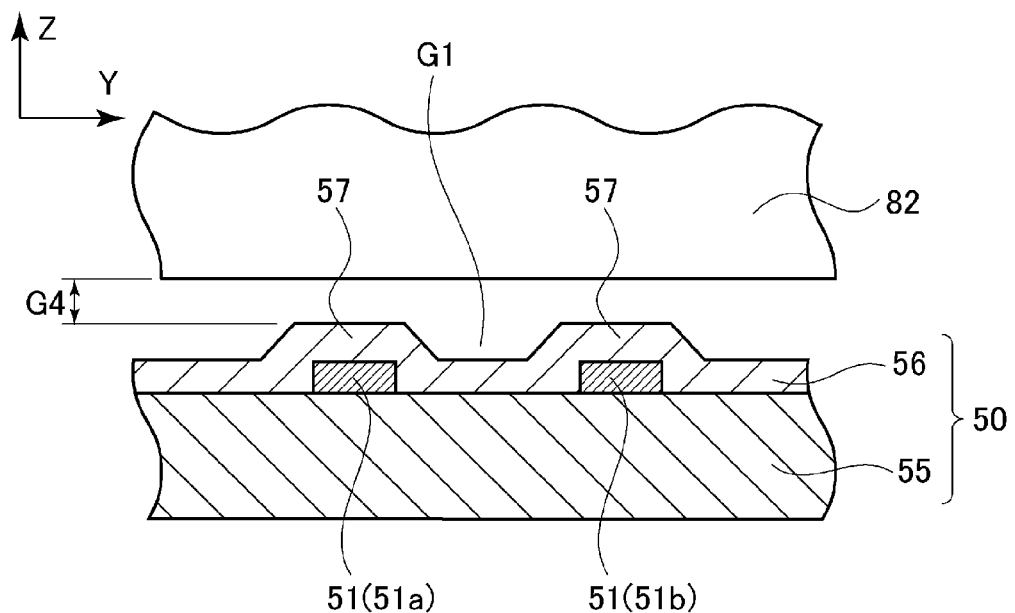
FIG. 15A is an enlarged sectional view of the circuit board 50 of Comparison Example 1 taken along line VII-VII illustrated in FIG. 10A.
Figure 15B:
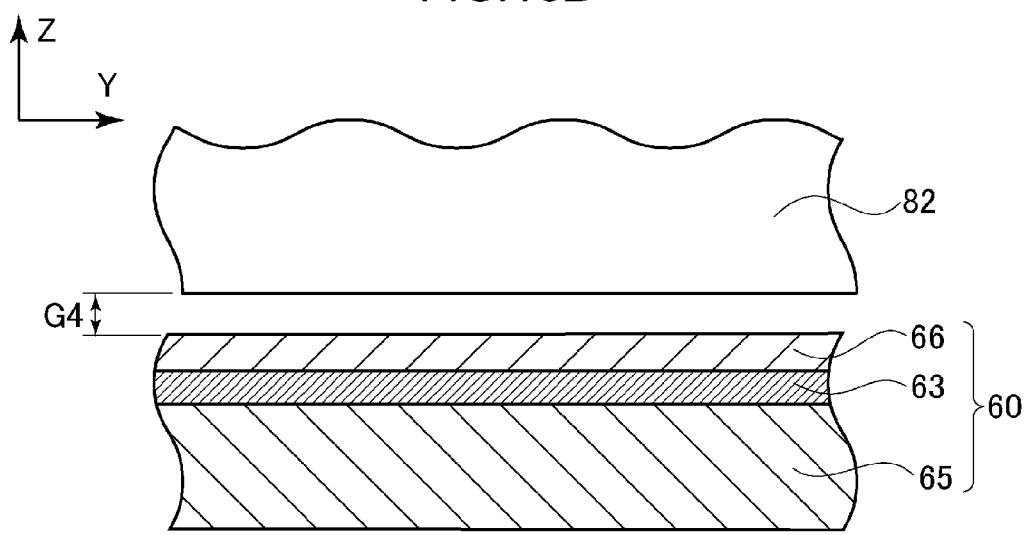
FIG. 15B is an enlarged sectional view of the circuit board 60 of the invented example taken along line VIII-VIII illustrated in FIG. 10B.

Next, by using the image sensor unit 80 in the second embodiment, stray light of Comparison Examples 1 and 2 and the invented example is inspected as in the first embodiment. As illustrated in FIG. 15A, in the case of using the circuit board 50 of Comparison Example 1, a gap G4 is also formed between the convex portions 57 and the lower surface of the light blocking portion 82 in addition to the gap G1 formed between the convex portions 57. Further, as illustrated in FIG. 15B, in the case of using the circuit board 60 of invented example, a gap G4 is formed between the surface of the solder resist 66 and the light blocking portion 19. Other components and the solder resist are common to those of the inspection of stray light of the first embodiment.

FIG. 16A is a graph illustrating the output of Comparison Example 1. FIG. 16B is a graph illustrating the output of Comparison Example 2. FIG. 16C is a graph illustrating the output of the invented example. In each graph, the vertical axis indicates the output value (mV) of the image sensor 30, and the horizontal axis indicates the distance of the image sensor 30 from the light source 22 side. In this connection, in the graphs of FIGS. 16A to 16C, output values smaller than zero are caused by noise.

In Comparison Example 1 illustrated in FIG. 16A, if the light source is at 1000 (mV), an output value of the image sensor 30 near the light source 22 is prominent (see the C portion illustrated in FIG. 16A). Thus, in Comparison Example 1, stray light occurs at the position near the light source 22.

Next, Comparison Example 2 illustrated in FIG. 16B has a reduced prominence of output value of the image sensor 30 in comparison with that in Comparison Example 1. Thus, Comparison Example 2 has reduced stray light in comparison with Comparison Example 1.

Lastly, the invented example illustrated in FIG. 16C has a reduced prominence of output value of the image sensor 30 in comparison with that in Comparison Example 1. Thus, the invented example has reduced stray light in comparison with Comparison Example 1.

As described above, with the configuration in the invented example, even in the case where the slight gap G4 is formed between the light blocking portion and the circuit board 40, occurrence of stray light can be reduced in comparison with Comparison Example 1, without using an expensive black solder resist.

Third Embodiment

In the invented examples of the first and second embodiments described above, the cases where the conductive portion 63 overlapping with a wider area in a plan view than the light blocking portion 19, 82 is formed on the circuit board 60 has been described. In this embodiment, conductive portions 91, 92 overlapping with parts of the light blocking portion 19 are described with reference to FIG. 17. In this connection, the same symbols are assigned to parts common to those of the first embodiment described above, and description of the parts will be omitted.

Figure 17:
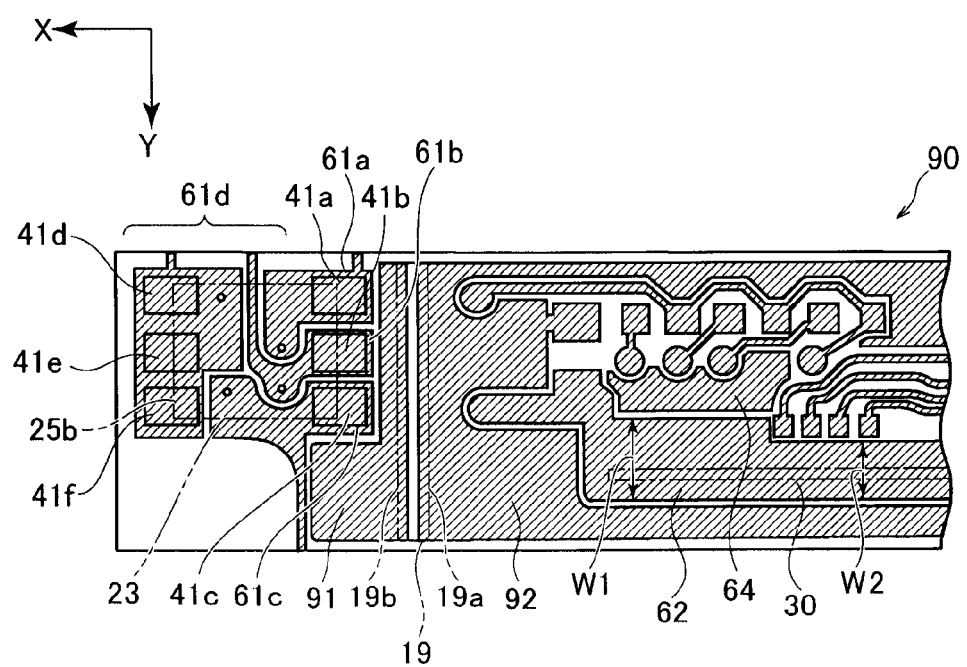
FIG. 17 is a view illustrating a configuration of a circuit board 90 of a third embodiment.

FIG. 17 is a view illustrating a configuration of a circuit board 90 according to a third embodiment. On the circuit board 90, the conductive portions 91, that overlap with parts of the light blocking portion 19 in a plan view are formed. Concretely, the conductive portion 91 is formed so as to continuously overlap with the external line 19b nearer to the LED package 23 between the external lines of the light blocking portion 19 in the sub-scan direction. Further, the conductive portion 92 is formed so as to continuously overlap with the external line 19a nearer to the image sensor 30 between the external lines of the light blocking portion 19 in the sub-scan direction.

As described above, the conductive portion 91 or is formed so as to continuously overlap with any external line between the two external lines 19a, 19b of the light blocking portion 19 in the sub-scan direction, whereby the gap G1 to be formed between the convex portions 57 as in Comparison Example 1 is not formed between the light blocking portion 19 and the circuit board 90. Therefore, any part of light emitted from the LED package 23 can be prevented from reaching the board housing portion 15. In this connection, the external lines 19a, 19b of the light blocking portion 19 in the sub-scan direction are not limited to straight lines. Alternatively, the lines may be curves, and irregularities may be formed in the main-scan direction.

In the foregoing, the present invention has been described using the above embodiments. However, the present invention is not limited to the embodiment described above. The present invention can be modified within the scope of the present invention, and the embodiments can be appropriately combined.

For example, in the embodiments described above, the light guide 32 having the bend portion 36 bent from the one end of the light emitter 33 also in the sub-scan direction has been described. The present invention is not limited to such a case. A light guide that is not bent in the sub-scan direction but is bent only in a plane formed by an X-axis and a Z-axis may be adopted.

Further, in the above embodiments, the case where the image sensor unit drive motor 108 moves the image sensor unit 10 in the sub-scan direction has been described. Alternatively, another configuration where an original P is conveyed by conveyor rollers or the like without moving the image sensor unit 10 may be adopted.

According to the present invention, any part of light emitted from the light source can be prevented from becoming stray light and being received by the image sensor.

What is claimed is:

1. An image sensor unit that reads light having been emitted to an object of illumination, comprising:
    a light source;
    a light guide that includes a light emitter having an emission surface from which light is emitted toward said object of illumination, and a bent portion that is bent from an end of said light emitter and has, at an end face, an incident surface on which the light from said light source is incident;
    a light condenser that focuses light from said object of illumination;
    an image sensor that receives the light focused by said light condenser, and converts the light into an electric signal;
    a circuit board that mounts said light source and said image sensor on one surface; and
    a frame that houses said light guide, said light condenser and said circuit board,
    wherein said frame includes a light blocking portion that protrudes toward said one surface of said circuit board at a position between said light source and said image sensor, and
    on said one surface of said circuit board, a conductive portion continuously overlapping with an external line of said light blocking portion in a sub-scan direction in a view of said circuit board in a direction orthogonal to said one surface is formed.

2. The image sensor unit according to claim 1, wherein said conductive portion is continuously formed in a wider range than said light blocking portion in the view of said circuit board in the direction orthogonal to said one surface.

3. The image sensor unit according to claim 1, wherein said light blocking portion is in contact with said one surface of said circuit board.

4. The image sensor unit according to claim 1, wherein on said circuit board, a plurality of light source conductive portions conducted with said light source in order to cause said light source to emit light are formed, and
    said plurality of light source conductive portions are formed on another surface of said circuit board, and each intersects with said light blocking portion in the view of said circuit board in the direction orthogonal to said one surface.

5. The image sensor unit according to claim 1, wherein said light source includes a rectangular casing, an LED chip arranged in said casing, and a plurality of terminals extending from an external line of a part of said casing, on said circuit board, a terminal conductive portion conducted with said plurality of terminals is formed, and said terminal conductive portion continuously overlaps with the external line of said part in the view of said circuit board in the direction orthogonal to said one surface.

6. The image sensor unit according to claim 1, wherein on said circuit board, a second conductive portion that overlaps with said image sensor in the view of said circuit board in the direction orthogonal to said one surface is formed, and said second conductive portion is formed such that a nearer side to said light source is wider in the sub-scan direction than a farther side.

7. An image reading apparatus, comprising:

an image sensor unit that reads light having been emitted to an object of illumination; and a moving portion that relatively moves said image sensor unit and said object of illumination, wherein said image sensor unit comprises:
   a light source;
   a light guide that includes a light emitter having an emission surface from which light is emitted toward said object of illumination, and a bent portion that is bent from an end of said light emitter and has, at an end face, an incident surface on which the light from said light source is incident;
   a light condenser that focuses light from said object of illumination;
   an image sensor that receives the light focused by said light condenser, and converts the light into an electric signal;
   a circuit board that mounts said light source and said image sensor on one surface; and
   a frame that houses said light guide, said light condenser and said circuit board,
wherein said frame includes a light blocking portion that protrudes toward said one surface of said circuit board at a position between said light source and said image sensor, and
on said one surface of said circuit board, a conductive portion continuously overlapping with an external line of said light blocking portion in a sub-scan direction in a view of said circuit board in a direction orthogonal to said one surface is formed.

8. An image forming apparatus, comprising:

an image sensor unit that reads light having been emitted to an object of illumination;

a moving portion that relatively moves said image sensor unit and said object of illumination; and an image forming portion that forms an image read by said image sensor unit on a recording medium, wherein said image sensor unit comprises:
   a light source;
   a light guide that includes a light emitter having an emission surface from which light is emitted toward said object of illumination, and a bent portion that is bent from an end of said light emitter and has, at an end face, an incident surface on which the light from said light source is incident;
   a light condenser that focuses light from said object of illumination;
   an image sensor that receives the light focused by said light condenser, and converts the light into an electric signal;
   a circuit board including one surface on which said light source and said image sensor are mounted; and
   a frame that houses said light guide, said light condenser and said circuit board,
wherein said frame includes a light blocking portion that protrudes toward said one surface of said circuit board at a position between said light source and said image sensor, and
on said one surface of said circuit board, a conductive portion continuously overlapping with an external line of said light blocking portion in a sub-scan direction in a view of said circuit board in a direction orthogonal to said one surface is formed.

9. A circuit board comprising:

an elongated substrate;

a metal foil; and a solder resist, wherein said circuit board includes an image sensor on a first side, said metal foil is laminated between said substrate and said solder resist on said first side, in a longitudinal direction of said substrate, said metal foil is arranged between said image sensor and a light source to thereby block light from said light source that has infiltrated said substrate so that the infiltrated light is prevented from being received by said image sensor, said metal foil is arranged in a region where a light blocking portion included in an image sensor unit is arranged on said circuit board, said light blocking portion and said circuit board form a space that is protected from stray light from said light source via said substrate so that the stray light does not reach said image sensor, said circuit board includes a wire-shaped conductive portion arranged in said longitudinal direction of said substrate, said wire-shaped conductive portion is not arranged across said region on said first side in said region in said longitudinal direction, but said wire-shaped conductive portion is arranged on a second side of said circuit board opposite said first side of said circuit board and below said region.

10. The circuit board according to claim 9, wherein said solder resist is green.

11. An image sensor unit, comprising:

the circuit board according to claim 9;

a rod-shaped light guide; and a rod-lens array.

12. A reading apparatus comprising:

the image sensor unit according to claim 11; and a moving portion that moves at least any one of said image sensor unit and an object of illumination.

13. An image forming apparatus comprising:

the reading apparatus according to claim 12; and an image forming portion that forms an image from read image information.

14. The image forming apparatus according to claim 13, wherein said image forming portion is any of an ink jet type, an electrophotographic type, a thermal transfer type, and a dot-impact type.

15. A reading apparatus comprising:

the image sensor unit according to claim 11; and a moving portion that moves at least any one of said image sensor unit and an object of illumination, wherein the reading apparatus is configured to authenticate a bill by reading the bill.

16. A circuit board comprising:

an elongated substrate;

a metal foil; and a solder resist, wherein said circuit board includes an image sensor on a first side, said metal foil is laminated between said substrate and said solder resist on said first side, in a longitudinal direction of said substrate, said metal foil is arranged between said image sensor and a light source to thereby block light from said light source that has infiltrated said substrate so that the infiltrated light is prevented from being received by said image sensor, said metal foil is arranged from an end of said substrate to another end of said substrate in a width direction of said substrate, said circuit board includes a wire-shaped conductive portion arranged in said longitudinal direction of said substrate, said wire-shaped conductive portion is not arranged across said metal foil on said first side in said longitudinal direction, but said wire-shaped conductive portion is arranged on a second side of said circuit board opposite said first side of said circuit board and below said metal foil.

17. The circuit board according to claim 16, wherein said solder resist is green.

18. An image sensor unit, comprising:
the circuit board according to claim 16;
a rod-shaped light guide; and
a rod-lens array.

19. A reading apparatus comprising:
the image sensor unit according to claim 18; and
a moving portion that moves at least any one of said image sensor unit and an object of illumination.

20. An image forming apparatus comprising:
the reading apparatus according to claim 19; and
an image forming portion that forms an image from read image information.

21. The image forming apparatus according to claim 20, wherein said image forming portion is any of an ink jet type, an electrophotographic type, a thermal transfer type, and a dot-impact type.

22. A reading apparatus comprising:
the image sensor unit according to claim 18; and
a moving portion that moves at least any one of said image sensor unit and an object of illumination,
wherein the reading apparatus is configured to authenticate a bill by reading the bill.

23. A circuit board comprising:
an elongated substrate;
a metal foil; and
a solder resist,
wherein said circuit board includes an image sensor on a first side,
said metal foil is laminated between said substrate and said solder resist on said first side,
in a longitudinal direction of said substrate, said metal foil is arranged at the same position as a position of said image sensor and is apart from said image sensor in a crossing direction to said longitudinal direction to thereby block light from a light source that has infiltrated said substrate so that the infiltrated light is prevented from being received by said image sensor,
said metal foil is separated from each of said image sensor, a wire, and a pad, on said first side, and
said metal foil is arranged in a space that is formed by said circuit board and a light blocking portion included in an image sensor unit having said circuit board.

24. The circuit board according to claim 23, wherein said solder resist is green.

25. An image sensor unit, comprising:
the circuit board according to claim 23;
a rod-shaped light guide; and
a rod-lens array.

26. A reading apparatus comprising:
the image sensor unit according to claim 25; and
a moving portion that moves at least any one of said image sensor unit and an object of illumination.

27. An image forming apparatus comprising:
the reading apparatus according to claim 26; and
an image forming portion that forms an image from read image information.

28. The image forming apparatus according to claim 27, wherein said image forming portion is any of an ink jet type, an electrophotographic type, a thermal transfer type, and a dot-impact type.

29. A reading apparatus comprising:
the image sensor unit according to claim 25; and
a moving portion that moves at least any one of said image sensor unit and an object of illumination,
wherein the reading apparatus is configured to authenticate a bill by reading the bill.

* * * * *